US012572153B1

(12) United States Patent (10) Patent No.: US 12,572,153 B1
Fu et al. (45) Date of Patent: Mar. 10, 2026

(54) ROUTE PLANNING FOR AERIAL VEHICLES IN INDOOR SPACES

(71) Applicant: Amazon Technologies, Inc., Seattle, WA (US)

(72) Inventors: Kah Kuen Fu, Cupertino, CA (US); Chen Hu, Milpitas, CA (US); Chong Huang, Goleta, CA (US); Yang Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 18/066,839

(22) Filed: Dec. 15, 2022

(51) Int. Cl.
| *B64U 20/70* | (2023.01) |
| *B64C 39/02* | (2023.01) |
| *G05D 1/00* | (2006.01) |
| *B64U 101/30* | (2023.01) |
| *B64U 101/70* | (2023.01) |

(52) U.S. Cl.
CPC ........... *G05D 1/106* (2019.05); *B64C 39/024* (2013.01); *B64U 20/70* (2023.01); *G05D 1/0653* (2013.01); *B64U 2101/30* (2023.01); *B64U 2101/70* (2023.01); *B64U 2201/20* (2023.01)

(58) Field of Classification Search
None
See application file for complete search history.

(56) References Cited

U.S. PATENT DOCUMENTS

| 3,417,729 A | 12/1968 | Gilday et al. |
| 3,575,527 A | 4/1971 | Sumitani et al. |
| 3,805,723 A | 4/1974 | Bernaerts |
| 4,865,248 A | 9/1989 | Barth |
| 4,954,962 A | 9/1990 | Evans, Jr. et al. |
| 5,040,116 A | 8/1991 | Evans, Jr. et al. |
| 5,283,739 A | 2/1994 | Summerville et al. |
| 5,371,581 A | 12/1994 | Wangler et al. |
| 5,386,462 A | 1/1995 | Schlamp |
| 5,452,374 A | 9/1995 | Cullen et al. |
| 5,497,236 A | 3/1996 | Wolff et al. |

(Continued)

FOREIGN PATENT DOCUMENTS

| CN | 101385059 A | 3/2009 |
| CN | 103224026 A | 7/2013 |

(Continued)

OTHER PUBLICATIONS

GeoSLAM_Aerial_Vehicle_and_Scanner_Carried_by_Human_ While_Walking (Year: 2022).*

(Continued)

*Primary Examiner* — Christian Chace
*Assistant Examiner* — Shane Emanuel Douglas
(74) *Attorney, Agent, or Firm* — Athorus, PLLC

(57) ABSTRACT

An aerial vehicle configured for operating within an indoor space is carried through the indoor space by a user, and data regarding positions and orientations of the aerial vehicle at each of a plurality of points is used to generate a route for the aerial vehicle. The route is simplified according to an iterative fit algorithm, and levels of collision risk are calculated for each of the points of the simplified route based on distances between segments of the simplified route leading into or from such points and obstacles or other objects. Points having unacceptable levels of collision risk are relocated, as necessary.

20 Claims, 25 Drawing Sheets

(56)  References Cited

U.S. PATENT DOCUMENTS

| | | | |
|---|---|---|---|
| 5,731,884 A | 3/1998 | Inoue |
| 5,847,522 A | 12/1998 | Barba |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,676,460 B1 | 1/2004 | Motsenbocker |
| 6,690,997 B2 | 2/2004 | Rivalto |
| 6,694,217 B2 | 2/2004 | Bloom |
| 6,705,523 B1 | 3/2004 | Stamm et al. |
| 6,804,607 B1 | 10/2004 | Wood |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,171,879 B2 | 2/2007 | Gass et al. |
| 7,188,513 B2 | 3/2007 | Wilson |
| 7,335,071 B1 | 2/2008 | Motsenbocker |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,526 B2 | 5/2011 | Zimet |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,473,189 B2 | 6/2013 | Christoph |
| 8,511,606 B1 | 8/2013 | Lutke et al. |
| 8,577,538 B2 | 11/2013 | Lenser et al. |
| 8,599,027 B2 | 12/2013 | Sanchez |
| 8,602,349 B2 | 12/2013 | Petrov |
| 8,639,400 B1 | 1/2014 | Wong |
| 8,736,820 B2 | 5/2014 | Choe et al. |
| 8,752,166 B2 | 6/2014 | Jung et al. |
| 8,791,790 B2 | 7/2014 | Robertson et al. |
| 8,874,301 B1 | 10/2014 | Rao et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,193,452 B2 | 11/2015 | Carreker |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,321,531 B1 | 4/2016 | Takayama et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,563,201 B1 | 2/2017 | Tofte et al. |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,677,564 B1 | 6/2017 | Woodworth et al. |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |
| 9,959,773 B2 | 5/2018 | Raptopoulos et al. |
| 9,972,212 B1 | 5/2018 | Sperindeo et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,137,984 B1 | 11/2018 | Flick |
| 10,315,528 B1 | 6/2019 | Crawford, Jr. |
| 10,418,830 B1 | 9/2019 | Parodi et al. |
| 10,434,885 B2 | 10/2019 | Antonini et al. |
| 10,558,226 B1 | 2/2020 | Bigdeli |
| 10,745,132 B1 | 8/2020 | Kimchi |
| 10,780,988 B2 | 9/2020 | Buchmueller et al. |
| 10,858,097 B2 | 12/2020 | Waters |
| 10,860,115 B1 | 12/2020 | Tran |
| 11,133,684 B1 | 9/2021 | Maurer et al. |
| 11,164,149 B1 | 11/2021 | Williams et al. |
| 11,603,219 B2 | 3/2023 | Ratajczak et al. |
| 11,619,952 B2 | 4/2023 | Kwon et al. |
| 11,628,932 B2 | 4/2023 | Seung et al. |
| 11,649,050 B1 | 5/2023 | Miller |
| 11,667,402 B2 | 6/2023 | Liske et al. |

(56)  References Cited

U.S. PATENT DOCUMENTS

| | | | |
|---|---|---|---|
| 11,726,184 | B2 | 8/2023 | Ferreira et al. |
| D999,675 | S | 9/2023 | Paterson |
| 11,776,136 | B1 | 10/2023 | Pachikov et al. |
| 11,808,580 | B1 | 11/2023 | Ebrahimi Afrouzi et al. |
| 11,820,507 | B2 | 11/2023 | Raptopoulos et al. |
| D1,008,873 | S | 12/2023 | Lin |
| 11,840,329 | B1 | 12/2023 | Hinman |
| 11,851,162 | B1 | 12/2023 | Daube et al. |
| 11,868,146 | B2 | 1/2024 | Yasunaga et al. |
| 11,933,613 | B2 | 3/2024 | Michini et al. |
| 11,939,080 | B2 | 3/2024 | Cowden |
| 11,987,402 | B2 | 5/2024 | Howe et al. |
| 11,993,409 | B2 | 5/2024 | Howe et al. |
| D1,046,685 | S | 10/2024 | Paterson |
| D1,048,023 | S | 10/2024 | Paterson |
| 12,116,143 | B2 | 10/2024 | Howe et al. |
| 12,131,656 | B2 | 10/2024 | Raptopoulos et al. |
| 12,168,533 | B1 | 12/2024 | Hinman et al. |
| 12,228,407 | B2 | 2/2025 | Twining |
| D1,073,682 | S | 5/2025 | Koh |
| 12,358,662 | B2 | 7/2025 | Roberts |
| 12,405,617 | B2 | 9/2025 | Tsai et al. |
| 12,406,221 | B2 | 9/2025 | Burch, V et al. |
| 2001/0045449 | A1 | 11/2001 | Shannon |
| 2002/0016726 | A1 | 2/2002 | Ross |
| 2002/0035450 | A1 | 3/2002 | Thackston |
| 2002/0072979 | A1 | 6/2002 | Sinha et al. |
| 2002/0087375 | A1 | 7/2002 | Griffin et al. |
| 2002/0107751 | A1 | 8/2002 | Rajagopalan et al. |
| 2002/0111914 | A1 | 8/2002 | Terada et al. |
| 2002/0116289 | A1 | 8/2002 | Yang |
| 2002/0123930 | A1 | 9/2002 | Boyd et al. |
| 2002/0156645 | A1 | 10/2002 | Hansen |
| 2003/0040980 | A1 | 2/2003 | Nakajima et al. |
| 2003/0072031 | A1 | 4/2003 | Kuwata et al. |
| 2003/0121968 | A1 | 7/2003 | Miller et al. |
| 2003/0141411 | A1 | 7/2003 | Pandya et al. |
| 2004/0002898 | A1 | 1/2004 | Kuhlmann et al. |
| 2004/0068416 | A1 | 4/2004 | Solomon |
| 2004/0112660 | A1 | 6/2004 | Johansson et al. |
| 2004/0160335 | A1 | 8/2004 | Reitmeier et al. |
| 2004/0162638 | A1 | 8/2004 | Solomon |
| 2004/0257199 | A1 | 12/2004 | Fitzgibbon et al. |
| 2005/0068178 | A1 | 3/2005 | Lee et al. |
| 2005/0093865 | A1 | 5/2005 | Jia |
| 2005/0102240 | A1 | 5/2005 | Misra et al. |
| 2005/0244060 | A1 | 11/2005 | Nagarajan et al. |
| 2005/0285934 | A1 | 12/2005 | Carter |
| 2006/0053534 | A1 | 3/2006 | Mullen |
| 2006/0118162 | A1 | 6/2006 | Saelzer et al. |
| 2006/0136237 | A1 | 6/2006 | Spiegel et al. |
| 2006/0287829 | A1 | 12/2006 | Pashko-Paschenko |
| 2007/0016496 | A1 | 1/2007 | Bar et al. |
| 2007/0073552 | A1 | 3/2007 | Hileman |
| 2007/0102565 | A1 | 5/2007 | Speer et al. |
| 2007/0150375 | A1 | 6/2007 | Yang |
| 2007/0170237 | A1 | 7/2007 | Neff |
| 2007/0210953 | A1 | 9/2007 | Abraham et al. |
| 2007/0228214 | A1 | 10/2007 | Horak |
| 2007/0233337 | A1 | 10/2007 | Plishner |
| 2007/0244763 | A1 | 10/2007 | Williams et al. |
| 2007/0246601 | A1 | 10/2007 | Layton |
| 2007/0262195 | A1 | 11/2007 | Bulaga et al. |
| 2007/0293978 | A1 | 12/2007 | Wurman et al. |
| 2008/0012697 | A1 | 1/2008 | Smith et al. |
| 2008/0027591 | A1 | 1/2008 | Lenser et al. |
| 2008/0100258 | A1 | 5/2008 | Ward |
| 2008/0109246 | A1 | 5/2008 | Russell |
| 2008/0111816 | A1 | 5/2008 | Abraham et al. |
| 2008/0141921 | A1 | 6/2008 | Hinderks |
| 2008/0150679 | A1 | 6/2008 | Bloomfield |
| 2008/0154659 | A1 | 6/2008 | Bettes et al. |
| 2008/0167817 | A1 | 7/2008 | Hessler et al. |
| 2008/0184906 | A1 | 8/2008 | Kejha |
| 2008/0189012 | A1 | 8/2008 | Kaufmann |
| 2008/0301009 | A1 | 12/2008 | Plaster et al. |
| 2009/0027253 | A1 | 1/2009 | Tooren et al. |
| 2009/0062974 | A1 | 3/2009 | Tamamoto et al. |
| 2009/0063166 | A1 | 3/2009 | Palmer |
| 2009/0079388 | A1 | 3/2009 | Reddy |
| 2009/0086275 | A1 | 4/2009 | Liang et al. |
| 2009/0091435 | A1 | 4/2009 | Bolourchi |
| 2009/0106124 | A1 | 4/2009 | Yang |
| 2009/0149985 | A1 | 6/2009 | Chirnomas |
| 2009/0164379 | A1 | 6/2009 | Jung et al. |
| 2009/0165127 | A1 | 6/2009 | Jung et al. |
| 2009/0216394 | A1 | 8/2009 | Heppe et al. |
| 2009/0236470 | A1 | 9/2009 | Goossen et al. |
| 2009/0254457 | A1 | 10/2009 | Folsom |
| 2009/0254482 | A1 | 10/2009 | Vadlamani et al. |
| 2009/0299903 | A1 | 12/2009 | Hung et al. |
| 2009/0303507 | A1 | 12/2009 | Abeloe |
| 2009/0314883 | A1 | 12/2009 | Arlton et al. |
| 2010/0007479 | A1 | 1/2010 | Smith |
| 2010/0030608 | A1 | 2/2010 | Kaminsky et al. |
| 2010/0031351 | A1 | 2/2010 | Jung et al. |
| 2010/0088163 | A1 | 4/2010 | Davidson et al. |
| 2010/0088175 | A1 | 4/2010 | Lundquist |
| 2010/0100269 | A1 | 4/2010 | Ekhaguere et al. |
| 2010/0169185 | A1 | 7/2010 | Cottingham |
| 2010/0193626 | A1 | 8/2010 | Goossen et al. |
| 2010/0206145 | A1 | 8/2010 | Tetelbaum et al. |
| 2010/0287065 | A1 | 11/2010 | Alivandi |
| 2010/0299067 | A1 | 11/2010 | McCollough et al. |
| 2010/0299222 | A1 | 11/2010 | Hamilton et al. |
| 2011/0024559 | A1 | 2/2011 | McGeer |
| 2011/0035149 | A1 | 2/2011 | McAndrew et al. |
| 2011/0074570 | A1 | 3/2011 | Feldstein et al. |
| 2011/0087350 | A1 | 4/2011 | Fogel et al. |
| 2011/0112761 | A1 | 5/2011 | Hurley et al. |
| 2011/0153052 | A1 | 6/2011 | Pettibone et al. |
| 2011/0166707 | A1 | 7/2011 | Romanov et al. |
| 2011/0178711 | A1 | 7/2011 | Christoph |
| 2011/0210866 | A1 | 9/2011 | David et al. |
| 2011/0227435 | A1 | 9/2011 | Maeda |
| 2011/0246331 | A1 | 10/2011 | Luther et al. |
| 2011/0253831 | A1 | 10/2011 | Cheng |
| 2011/0264311 | A1 | 10/2011 | Lee et al. |
| 2011/0282476 | A1 | 11/2011 | Hegemier et al. |
| 2011/0301787 | A1 | 12/2011 | Chaperon et al. |
| 2011/0313878 | A1 | 12/2011 | Norman |
| 2012/0039694 | A1 | 2/2012 | Suzanne |
| 2012/0078592 | A1 | 3/2012 | Sims |
| 2012/0091260 | A1 | 4/2012 | Callou |
| 2012/0109419 | A1 | 5/2012 | Mercado |
| 2012/0219397 | A1 | 8/2012 | Baker |
| 2012/0221438 | A1 | 8/2012 | Cook et al. |
| 2012/0227389 | A1 | 9/2012 | Hinderks |
| 2012/0229325 | A1 | 9/2012 | Dutruc |
| 2012/0234969 | A1 | 9/2012 | Savoye et al. |
| 2012/0235606 | A1 | 9/2012 | Takeuchi |
| 2012/0323365 | A1 | 12/2012 | Taylor et al. |
| 2013/0006739 | A1 | 1/2013 | Horvitz et al. |
| 2013/0073477 | A1 | 3/2013 | Grinberg |
| 2013/0081245 | A1 | 4/2013 | Vavrina et al. |
| 2013/0093582 | A1 | 4/2013 | Walsh et al. |
| 2013/0126611 | A1 | 5/2013 | Kangas et al. |
| 2013/0148123 | A1 | 6/2013 | Hayashi |
| 2013/0193269 | A1 | 8/2013 | Zwaan et al. |
| 2013/0206915 | A1 | 8/2013 | Desaulniers |
| 2013/0218446 | A1 | 8/2013 | Bradley et al. |
| 2013/0218799 | A1 | 8/2013 | Lehmann et al. |
| 2013/0261792 | A1 | 10/2013 | Gupta et al. |
| 2013/0262251 | A1 | 10/2013 | Wan et al. |
| 2013/0262252 | A1 | 10/2013 | Lakshman et al. |
| 2013/0262276 | A1 | 10/2013 | Wan et al. |
| 2013/0262336 | A1 | 10/2013 | Wan et al. |
| 2013/0264381 | A1 | 10/2013 | Kim et al. |
| 2013/0320133 | A1 | 12/2013 | Ratti et al. |
| 2013/0324164 | A1 | 12/2013 | Vulcano |
| 2013/0332062 | A1 | 12/2013 | Kreitmair-Steck et al. |
| 2014/0010656 | A1 | 1/2014 | Nies |
| 2014/0022055 | A1 | 1/2014 | Levien et al. |
| 2014/0025230 | A1 | 1/2014 | Levien et al. |

(56)        References Cited

U.S. PATENT DOCUMENTS

| | | |
|---|---|---|
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0271200 A1 | 9/2014 | Sutton et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0098819 A1 | 4/2015 | Tourin et al. |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0191255 A1 | 7/2015 | Zolich et al. |
| 2015/0193971 A1* | 7/2015 | Dryanovski ............ G06T 17/05 |
| | | 345/419 |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0286216 A1 | 10/2015 | Miwa |
| 2015/0314881 A1 | 11/2015 | Tsaliah et al. |
| 2015/0317597 A1 | 11/2015 | Shucker et al. |
| 2015/0332206 A1 | 11/2015 | Trew et al. |
| 2015/0336670 A1 | 11/2015 | Zhang et al. |
| 2015/0367850 A1 | 12/2015 | Clarke et al. |
| 2015/0370251 A1 | 12/2015 | Siegel et al. |
| 2016/0001877 A1 | 1/2016 | Paulos |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0051110 A1 | 2/2016 | Cao et al. |
| 2016/0058181 A1 | 3/2016 | Han et al. |
| 2016/0068267 A1 | 3/2016 | Liu et al. |
| 2016/0070265 A1 | 3/2016 | Liu et al. |
| 2016/0085238 A1 | 3/2016 | Hayes |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0125746 A1 | 5/2016 | Kunzi et al. |
| 2016/0129592 A1 | 5/2016 | Saboo et al. |
| 2016/0130015 A1 | 5/2016 | Caubel et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0180618 A1 | 6/2016 | Ho et al. |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0214728 A1 | 7/2016 | Rossi et al. |
| 2016/0221671 A1 | 8/2016 | Fisher et al. |
| 2016/0229530 A1 | 8/2016 | Welsh et al. |
| 2016/0235236 A1 | 8/2016 | Byers et al. |
| 2016/0236778 A1 | 8/2016 | Takayama et al. |
| 2016/0239789 A1 | 8/2016 | Hanks |
| 2016/0239803 A1 | 8/2016 | Borley et al. |
| 2016/0257401 A1 | 9/2016 | Buchmueller et al. |
| 2016/0258775 A1 | 9/2016 | Santilli et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0321503 A1 | 11/2016 | Zhou |
| 2016/0334229 A1 | 11/2016 | Ross et al. |
| 2016/0340021 A1 | 11/2016 | Zhang et al. |
| 2016/0364660 A1 | 12/2016 | Brown |
| 2016/0364679 A1 | 12/2016 | Cao |
| 2016/0364823 A1 | 12/2016 | Cao |
| 2016/0364989 A1 | 12/2016 | Speasl et al. |
| 2016/0371984 A1 | 12/2016 | Macfarlane et al. |
| 2017/0011333 A1 | 1/2017 | Greiner et al. |
| 2017/0011340 A1 | 1/2017 | Gabbai |
| 2017/0032315 A1 | 2/2017 | Gupta et al. |
| 2017/0087999 A1 | 3/2017 | Miller et al. |
| 2017/0096222 A1 | 4/2017 | Spinelli et al. |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0147975 A1 | 5/2017 | Natarajan et al. |
| 2017/0152060 A1 | 6/2017 | Morisawa |
| 2017/0154347 A1 | 6/2017 | Bateman |
| 2017/0164319 A1 | 6/2017 | Skaaksrud et al. |
| 2017/0167881 A1 | 6/2017 | Rander et al. |
| 2017/0193442 A1 | 7/2017 | Ekkel et al. |
| 2017/0199522 A1 | 7/2017 | Li et al. |
| 2017/0225783 A1 | 8/2017 | Fisher et al. |
| 2017/0255896 A1 | 9/2017 | Dyke |
| 2017/0286905 A1 | 10/2017 | Richardson et al. |
| 2017/0300855 A1 | 10/2017 | Lund et al. |
| 2017/0305526 A1 | 10/2017 | Thomassey |
| 2017/0308098 A1 | 10/2017 | Yu et al. |
| 2017/0316379 A1 | 11/2017 | Lepek et al. |
| 2017/0330145 A1 | 11/2017 | Studnicka et al. |
| 2017/0345245 A1 | 11/2017 | Torresani et al. |
| 2017/0372256 A1 | 12/2017 | Kantor et al. |
| 2018/0024554 A1 | 1/2018 | Brady et al. |
| 2018/0088586 A1 | 3/2018 | Hance et al. |
| 2018/0118340 A1 | 5/2018 | Russo |
| 2018/0127211 A1 | 5/2018 | Jarvis et al. |
| 2018/0137454 A1 | 5/2018 | Kulkarni et al. |
| 2018/0203464 A1 | 7/2018 | Yu et al. |
| 2018/0257775 A1 | 9/2018 | Baek et al. |
| 2019/0051192 A1 | 2/2019 | Schick et al. |
| 2019/0135403 A1 | 5/2019 | Perry et al. |
| 2019/0161190 A1 | 5/2019 | Gil et al. |
| 2019/0172358 A1 | 6/2019 | Zhou et al. |
| 2020/0272144 A1 | 8/2020 | Yang et al. |
| 2020/0284883 A1 | 9/2020 | Ferreira et al. |
| 2020/0324898 A1 | 10/2020 | Youmans et al. |
| 2020/0369384 A1 | 11/2020 | Kelly |
| 2021/0089055 A1 | 3/2021 | Tran |
| 2021/0094686 A1 | 4/2021 | Metzner et al. |
| 2022/0009647 A1 | 1/2022 | Johannesson et al. |
| 2022/0144424 A1 | 5/2022 | Metzner et al. |
| 2022/0162001 A1 | 5/2022 | Gherardi et al. |
| 2022/0163980 A1 | 5/2022 | Beer et al. |
| 2022/0278538 A1 | 9/2022 | Kainzmaier |
| 2023/0044050 A1 | 2/2023 | Cevacins |
| 2023/0045691 A1 | 2/2023 | Cevacins |
| 2023/0065140 A1 | 3/2023 | Blevins et al. |
| 2023/0167653 A1 | 6/2023 | Waters |
| 2023/0244249 A1 | 8/2023 | Smith et al. |

(56)                References Cited

U.S. PATENT DOCUMENTS

| | | | |
|---|---|---|---|
| 2023/0298268 A1 | 9/2023 | Oleynikova et al. |
| 2024/0010368 A1 | 1/2024 | Liao |
| 2024/0051688 A1 | 2/2024 | Valero |
| 2025/0108943 A1 | 4/2025 | Sekiguchi |
| 2025/0269989 A1 | 8/2025 | Hasni |

FOREIGN PATENT DOCUMENTS

| | | | | | |
|---|---|---|---|---|---|
| CN | 203039518 U | 7/2013 | | | |
| CN | 103365297 A | 10/2013 | | | |
| CN | 104760704 A | 7/2015 | | | |
| CN | 109118826 A | 1/2019 | | | |
| DE | 102011086497 A1 | 5/2013 | | | |
| EP | 3415436 A1 | 12/2018 | | | |
| FR | 2692064 A1 | 12/1993 | | | |
| GB | 2455374 A | 6/2009 | | | |
| JP | S48088255 U | 10/1973 | | | |
| JP | S56048952 | 11/1981 | | | |
| JP | H0712088 A | 1/1995 | | | |
| JP | 2004126800 A | 4/2004 | | | |
| JP | 2009297449 A | 12/2009 | | | |
| JP | 2010095246 A | 4/2010 | | | |
| JP | 2011211025 A | 10/2011 | | | |
| JP | 2012037204 A | 2/2012 | | | |
| WO | 2007052246 A1 | 5/2007 | | | |
| WO | 2008147484 A2 | 12/2008 | | | |
| WO | 2008147484 A3 | 2/2009 | | | |
| WO | 2009153588 A1 | 12/2009 | | | |
| WO | 2010070717 A1 | 6/2010 | | | |
| WO | 2012012752 A2 | 1/2012 | | | |
| WO | 2012012752 A9 | 6/2012 | | | |
| WO | 2013140085 A1 | 9/2013 | | | |
| WO | 2013148123 A1 | 10/2013 | | | |
| WO | 2014064431 A2 | 5/2014 | | | |
| WO | 2014068982 A1 | 5/2014 | | | |
| WO | 2014080409 A1 | 5/2014 | | | |
| WO | 2014064431 A3 | 7/2014 | | | |
| WO | 2017064202 A1 | 4/2017 | | | |
| WO | WO-2017186137 A1 * | 11/2017 | .......... | B64C | 39/024 |
| WO | WO-2018136753 A1 * | 7/2018 | .......... | B64C | 39/024 |
| WO | 2018156991 A1 | 8/2018 | | | |

OTHER PUBLICATIONS

GeoSLAM_Initial_Walk_with_UAV_and Scanner (Year: 2022).*
GeoSLAM_Justification_for_Combining_Scanner_Method_Data_With_Other_Art (Year: 2022).*
GeoSLAM_Sensor_Feature (Year: 2022).*
GeoSLAM Website (Year: 2022).*
Jin-Woo (https://www.mdpi.com/2076-3417/9/4/638) (Year: 2019).*
Juan (https://www.researchgate.net/publication/274622763_The_Exact_Euclidean_Distance_Transform_A_New_Algorithm_for_Universal_Path_Planning) (Year: 2021).*
José Ricardo Sánchez-Ibáñez (https://www.mdpi.com/1424-8220/21/23/7898) (Year: 2022).*
GeoSlam 1. https://web.archive.org/web/20221210081200/https://geoslam.com/solutions/zeb-horizon/ (Year: 2022).*
The Exact Euclidean Distance Transform: A New Algorithm for Universal Path Planning Juan et al (Year: 2013).*
An Autonomous Landing and Charging System for Drones Jiang et al 2018 (Year: 2018).*
Path Planning for Autonomous Mobile Robots: A Review Sanchez-Ibanez et al (Year: 2021).*
Bullock et al., "Analysis of the Use of Digital Road Maps in Vehicle Navigation," 1994, IEEE, p. 494-501 (Year: 1994).
DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Hawas et al., "Infrastructureless Inter-Vehicular Real-Time Route Guidance," 2008, IEEE, p. 1213-1219 (Year: 2008).
Kais, Mikael et al., "An Intelligent architecture for automated transportation in our cities", 2001 European Control Conference (ECC), Porto, Portugal, Sep. 4-7, 2001, pp. 277-282 (Year: 2001).
Kladis et al., "Event-Based Energy Optimum Route Planning in the Context of Unmanned Aerial Vehicles for Multi-Objective Exploration Missions," 2009, IEEE, p. 1281-1286 (Year: 2009).
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.
Mike Murphy, "Google wants to deliver packages from self-driving trucks," published Feb. 9, 2016, URL: https://qz.com/613277/google-wants-to-deliver-packages-from-self-driving-trucks/, 4 pages.
Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013, URL: https://web.archive.org/web/20190616235755/http://www.aeraccess-group.com/product/indoor/nanohawk [Retrieved from the Internet: Dec. 10, 2020]; the whole document.
Navaravong et al., "Formation Reconfiguration for Mobile Robots with Network Connectivity Constraints," 2012, IEEE, p. 18-24 (Year: 2012).
Parent, Michel et al., "Intelligent Transportation in Cities with CTS", The IEEE 5th International Conference on Intelligent Transportation Systems, Sep. 3-6, 2002, Singapore, pp. 826-830 (Year: 2002).
Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.
Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.
URL: https://web.archive.org/web/20160804001046/https://www.starship.xyz/, download date: Aug. 4, 2016, 21 pages.
Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.
Andrew Amato, "Parrot Announces New Bobop Drone", Dronelife.com, May 12, 2014; http://dronelife.com/2014/05/12/parrot-announces-new-bebop-drone/, accessed Dec. 21, 2016.
Ivan Barajas, "Parrot Unveils New Drone and Controller," May 14, 2014; https://blog.newegg.com/parrot-unveils-drone-controller-oculus-compatible/, accessed Dec. 21, 2016.
Microchip Technology Inc. AT42QT1010 Data Sheet. Copyright © 2017 Microchip Technology Inc. 30 pages.
MicroPilot home page, https://www.micropilot.com/; archived on Jan. 3, 2013 by Internet Archive, http://web.archive.org/web/2013103180733/http://www.micropilot.com/?, accessed May 2, 2016.
Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.
rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.
Wang, David. Application Report: FDC1004: Basics of Capacitive Sensing and Applications. SNOA927A—Dec. 2014—Revised Jun. 2021. Copyright © 2021 Texas Instruments Incorporated. 12 pages.

(56)     References Cited

OTHER PUBLICATIONS

Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).

Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

* cited by examiner

PATH TRAVELED BY USER WITHIN INDOOR SPACE $P_i(x_i, y_i, z_i, \psi_i, \phi_i, \theta_i)$ $P_n$

110

165-1

RAW DATA CAPTURED WHILE TRAVELING ALONG PATH

FIRST SIMPLIFIED ROUTE DERIVED FROM RAW DATA USING COARSENING PARAMETER $\varepsilon_1$ $P_i(x_i, y_i, z_i, Y_i, \psi_i, \phi_i, \theta_i)$ SECOND SIMPLIFIED ROUTE DERIVED FROM FIRST SIMPLIFIED ROUTE AND
RAW DATA USING COARSENING PARAMETER $\varepsilon_2 < \varepsilon_1$ WAYPOINT HAVING GREATEST COLLISION RISK IDENTIFIED FROM ENVIRONMENT MAP OF INDOOR SPACE

GRID REPRESENTING DISTANCES TO NEAREST OBSTACLES APPLIED TO WAYPOINT

RELOCATE WAYPOINT HAVING MAXIMUM COLLISION RISK TO ANOTHER
CELL WITHIN GRID

SECOND SIMPLIFIED ROUTE MODIFIED BASED ON RELOCATED WAYPOINT

USER TRAVELS ALONG PATH WITHIN INDOOR SPACE $$\bullet \ P_i(x_i, \ y_i, \ z_i, \ \psi_i, \ \phi_i, \ \theta_i)$$

CAPTURED WHILE TRAVELING ALONG PATH

SIMPLIFIED ROUTE DETERMINED FROM ROUTE USING
ITERATIVE FIT ALGORITHM 445-n

435

EUCLIDEAN DISTANCE TRANSFORM

430

3D ENVIRONMENT MAP OF INDOOR SPACE

COMPUTE COLLISION RISK OF EACH WAYPOINT USING
EUCLIDEAN DISTANCE TRANSFORM

RELOCATE WAYPOINT HAVING GREATEST COLLISION RISK USING
EUCLIDEAN DISTANCE TRANSFORM

UPDATED SIMPLIFIED ROUTE FOLLOWING RELOCATION
OF WAYPOINT

RELOCATE END WAYPOINT TO PREFERRED POSITION FOR
HOVERING AND ADD WAYPOINT FOR LANDING

ROUTE PLANNING FOR AERIAL VEHICLES IN INDOOR SPACES

BACKGROUND

Aerial vehicles that are configured for operation within indoor spaces may be programmed or instructed to travel on routes in various ways. For example, where an aerial vehicle is outfitted with an inertial measurement unit (or "IMU"), a Global Positioning System ("GPS") receiver, or one or more other sensors for determining positions or orientations of the aerial vehicle, the aerial vehicle may be carried or otherwise transported by a human operator along a desired route throughout an indoor space, and the inertial measurement unit may determine positions or orientations of the aerial vehicle while the aerial vehicle is carried by the human operator. Subsequently, the aerial vehicle may attempt to mimic or otherwise travel along the route when performing one or more tasks or missions within the indoor space. Alternatively, a human operator may select or designate a route to be traveled by an aerial vehicle within an indoor space in any other manner, such as by one or more gestures or other interactions with a computer device or system.

However, where a human operator selects or designates a route for an aerial vehicle, either by carrying the aerial vehicle or in any other manner, data representing the selected or designated route is typically raw or coarse, or is otherwise lacking in precision. Moreover, whereas a human operator may utilize each of his or her senses while guiding an aerial vehicle along a route throughout an indoor space, and avoiding any obstacles or other objects that may be encountered within the indoor space, the aerial vehicle does not have the benefit of such senses. Instead, an aerial vehicle must utilize onboard sensors, such as an inertial measurement unit, "time-of-flight" sensors, "light detection and ranging" (or "LIDAR") sensors, cameras, or others, which are less reliable and less accurate than human eyes or ears, when attempting to subsequently travel along a programmed or instructed route during in-flight operations, particularly in indoor spaces, where hallways are often narrower than one to two meters in width, or where distances between floors and ceilings are often three meters or less. A route that is apparently safe and free of risk of collision to a human carrying an aerial vehicle may be less safe, or may have an unacceptable risk of collision, when the aerial vehicle autonomously travels the same route without the benefit of human guidance.

BRIEF DESCRIPTION OF THE DRAWINGS

FIGS. 1A through 1L are views of aspects of one system for route planning in accordance with embodiments of the present disclosure.

DETAILED DESCRIPTION

As is set forth in greater detail below, the present disclosure is directed to systems and methods for route planning for aerial vehicles operating within spaces having limited or narrow dimensions, such as indoor spaces. More specifically, the systems and methods of the present disclosure are directed to determining a route for an aerial vehicle based on raw data captured by the aerial vehicle as a user carries the aerial vehicle by hand throughout an indoor space, or received from a user of the aerial vehicle, and simplifying the route according to one or more algorithms or techniques, e.g., to reduce a number of waypoints or segments of the simplified route. Once the route has been simplified, a collision risk associated with each of the waypoints may be determined, based on minimum distances between segments into and out of each waypoint and nearby obstacles. Individual waypoints of a simplified route may be adjusted, as necessary, to reduce a collision risk associated with each of such waypoints or segments to an acceptable level. Once the simplified route has been adjusted accordingly, the aerial vehicle may be programmed or otherwise configured to travel along the simplified route during the performance of one or more tasks or mission within the indoor space.

The systems and methods of the present disclosure are particularly useful for aerial vehicles operating in indoor environments where distances or ranges to obstacles or objects are substantially short, where maneuverability may be limited, where natural light conditions are low, or where surfaces within such environments are unfavorable.

Figure 1A:
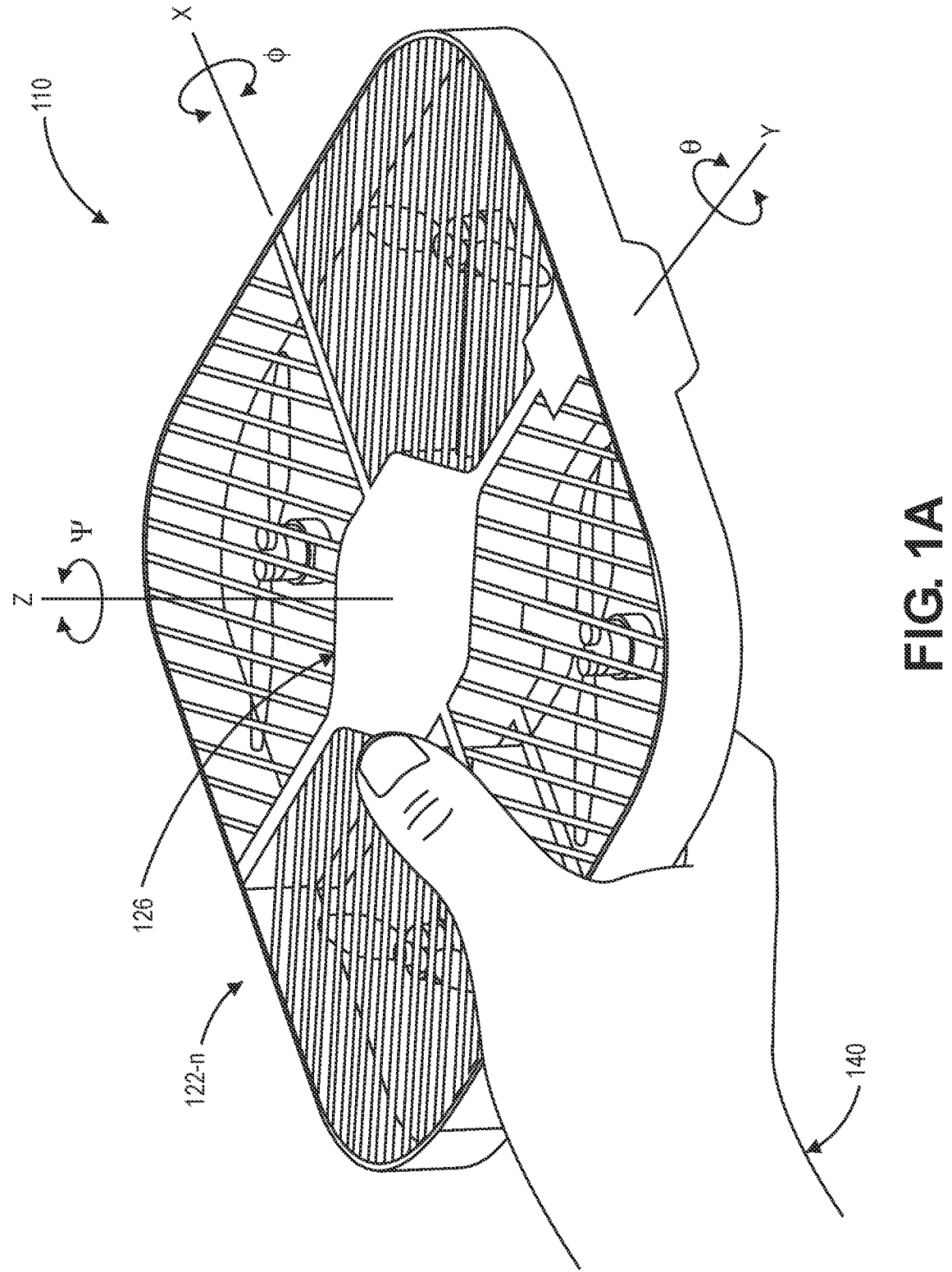
Figure 1B:
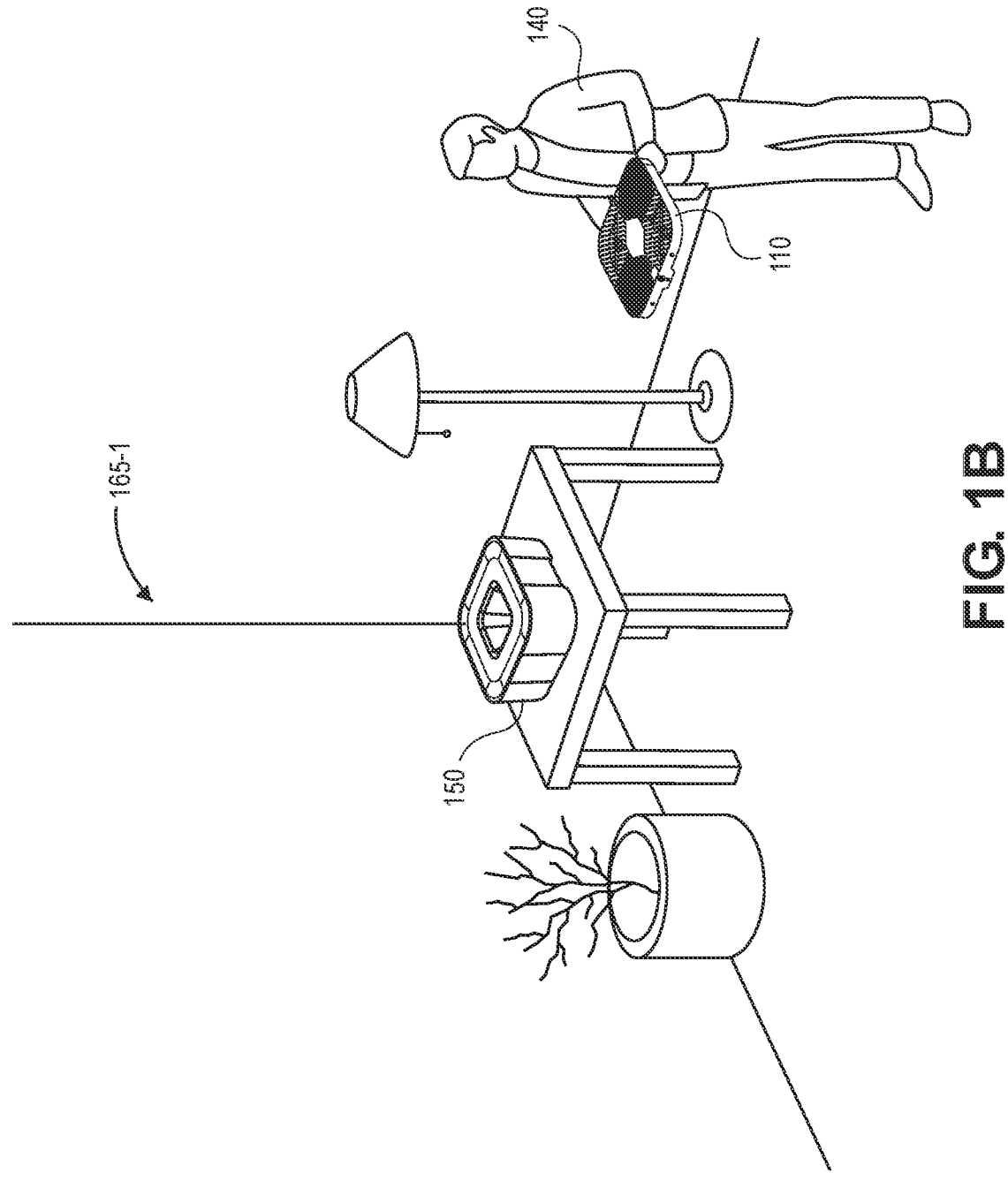
Figure 1C:
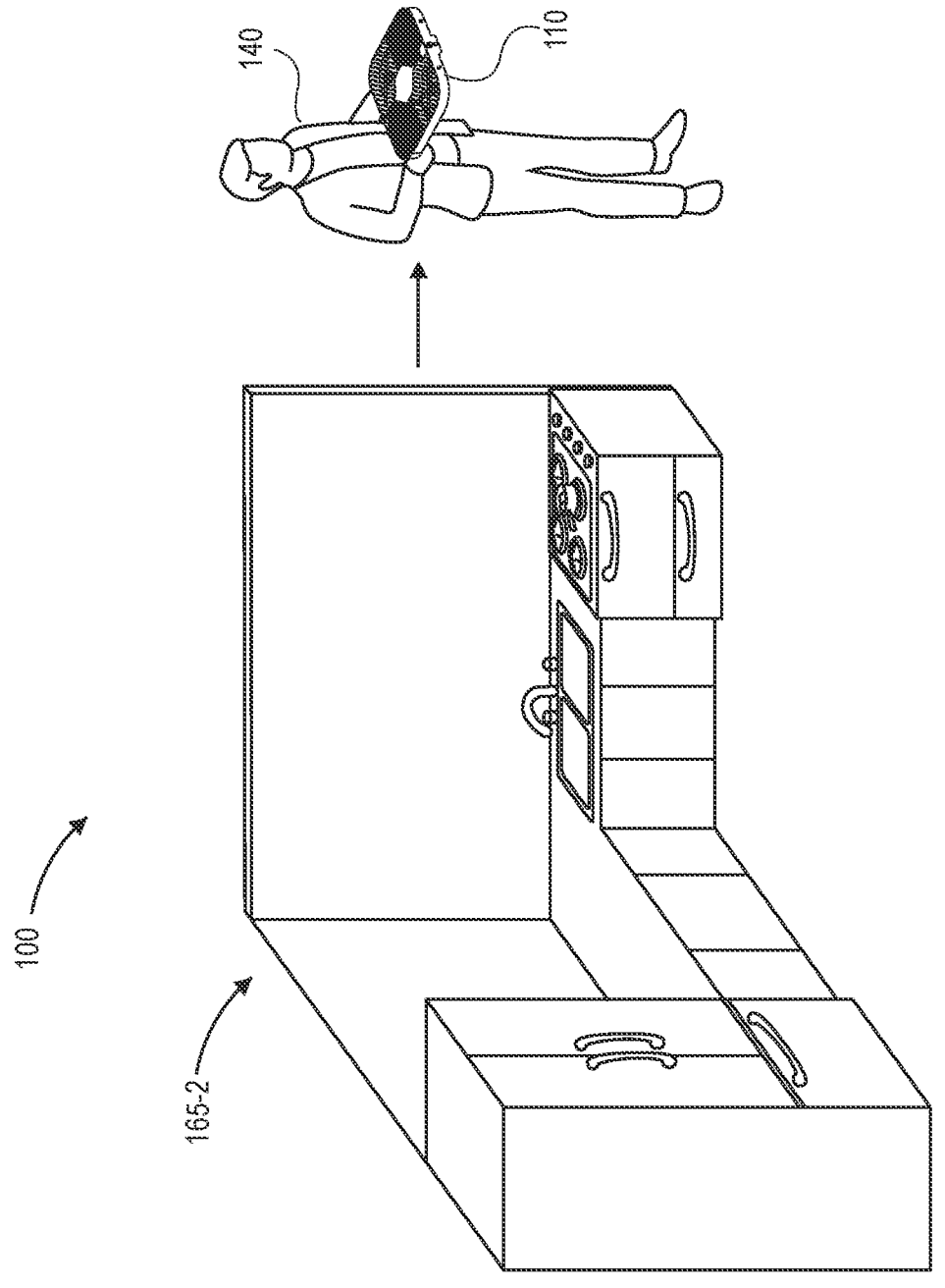
Figure 1D:
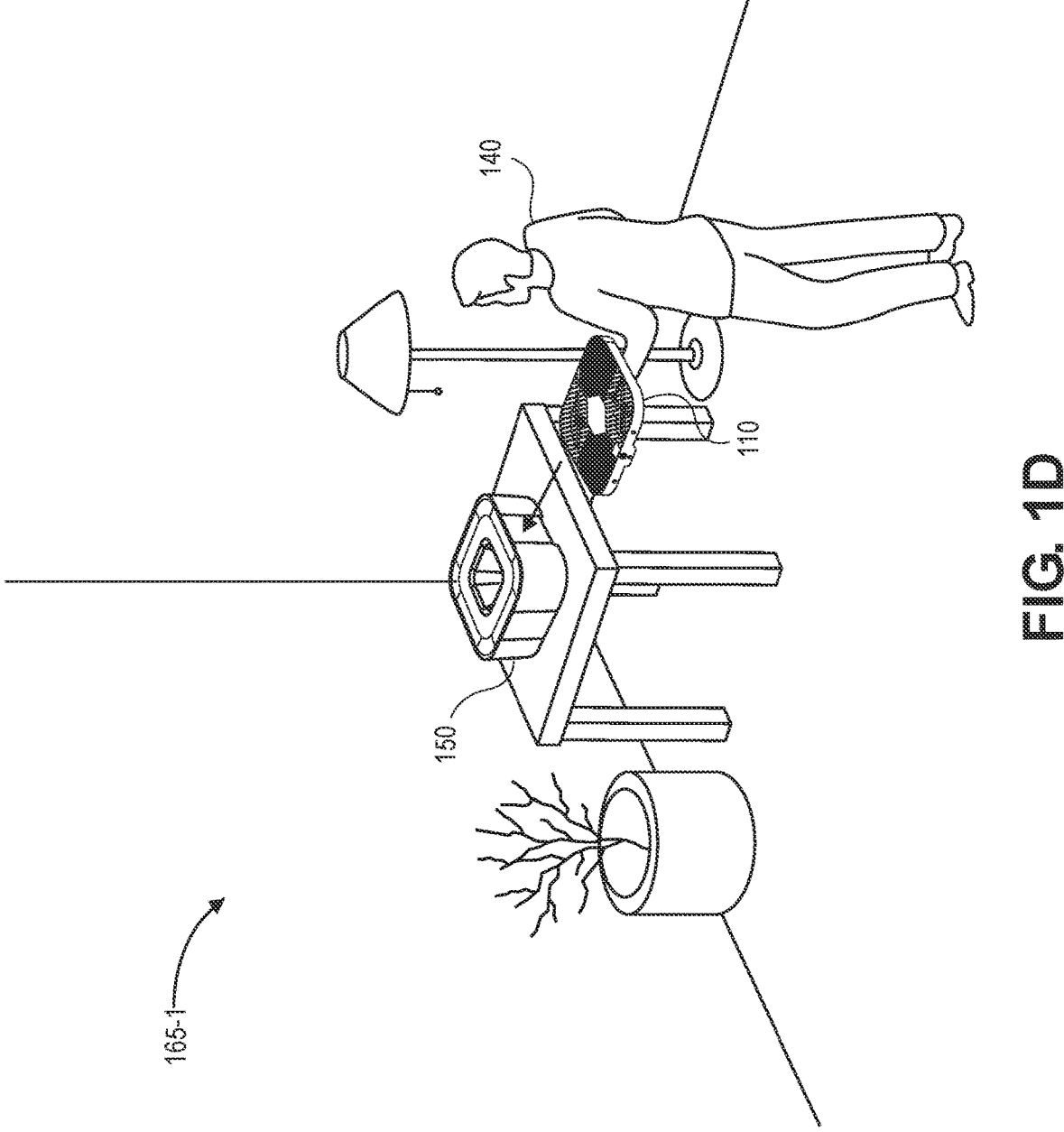
Figure 1E:
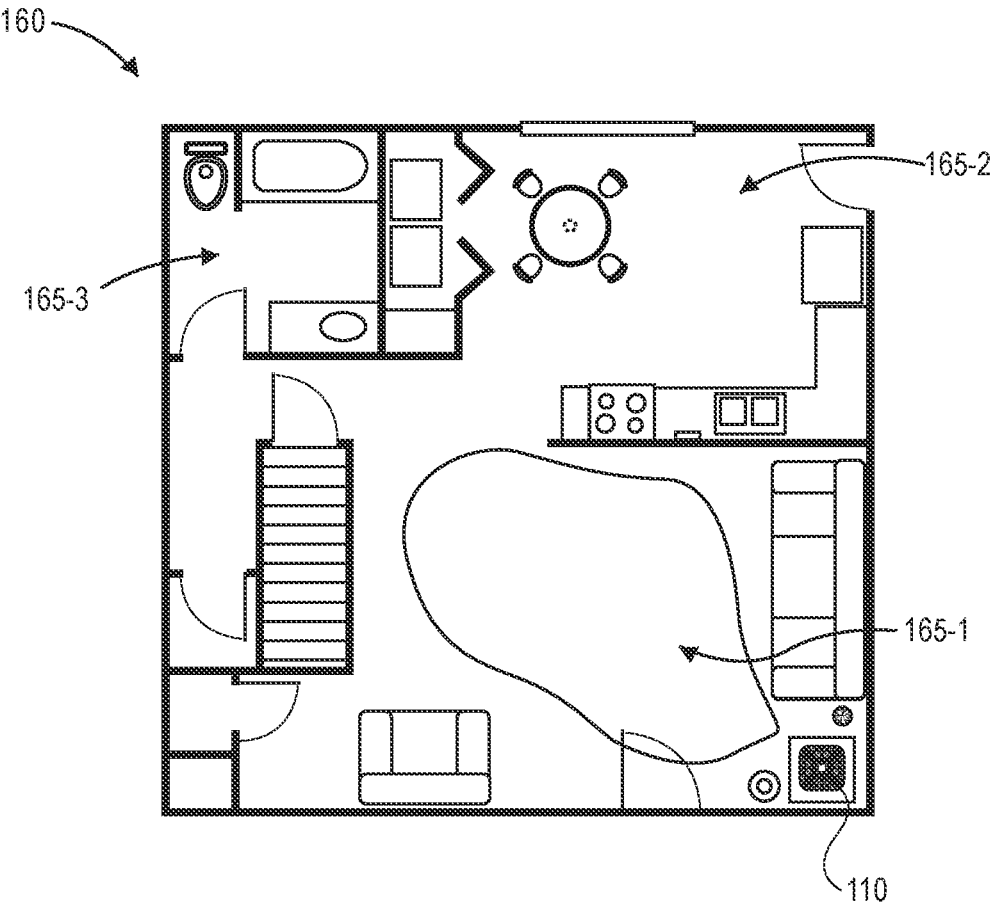

Referring to FIGS. 1A through 1L, views of aspects of one system in accordance with embodiments of the present disclosure are shown. As is shown in FIG. 1A, an aerial vehicle (or drone) 110 is outfitted with a plurality of propulsion motors 122-$n$, and an inertial measurement unit 126 is grasped by one or more hands of a user 140 (or another human actor).

The aerial vehicle 110 may have any shape or size, and may include a frame and a pair of covers. For example, as is shown in FIG. 1A, a frame of the aerial vehicle 110 may be defined by a plurality of sides (e.g., four sides) and may have a common height. For example, as is shown in FIG. 1A, the frame may have a substantially square cross-section, e.g., a cross-section in the shape of a square with rounded corners or edges, or a squircle, with a substantially constant height, or with a height having one or more extensions above or below a balance of the frame.

Additionally, in some implementations, the aerial vehicle 110 may include a fuselage (or a housing or a chamber) having a shape that is also defined by a plurality of sides (e.g., four sides) and a common height. For example, a fuselage may also have a substantially square cross-section, e.g., a cross-section in the shape of a square with rounded corners or edges, or a squircle, with a constant height. Alternatively, in some embodiments, a frame or a fuselage (or a housing or a chamber) of the aerial vehicle 110 may have cross-sections of any other sizes or shapes, e.g., rectangles other than squares, triangles, or any other polygons, or circles or any other curvilinear shapes.

For example, in some implementations, a height of a fuselage (or a housing or a chamber) of the aerial vehicle 110 may be greater than a height of a frame of the aerial vehicle 110, and a length or width of the frame may be greater than a length or width of the fuselage. Alternatively, in some embodiments, a fuselage (or a housing or a chamber) of the aerial vehicle 110 may have cross-sections of any other sizes or shapes, e.g., rectangles other than squares, triangles, or any other polygons, or circles or any other curvilinear shapes. In some embodiments, a frame and a fuselage (or a housing or a chamber) may have the same or similar shapes, where each of the sides of the frame is parallel to at least one of the sides of the fuselage. In some other embodiments, however, a frame and a fuselage (or a housing or a chamber) may have different or dissimilar shapes, and sides of the frame and sides of the fuselage need not be parallel to one another.

In some implementations, the frame and a fuselage (or a housing or a chamber) may be mounted to one another in a manner that causes a geometric center or centroid of a cross-section of the frame to be aligned along a common axis with a geometric center or centroid of a cross-section of the fuselage.

In some implementations, the aerial vehicle 110 may also include a time-of-flight sensor module or a LIDAR sensor module or a time-of-flight sensor module provided at least partially above or below the frame or a fuselage (or a housing or a chamber).

The propulsion motors 122-$n$ may be of any number, e.g., four, and of any type or form of motor (e.g., electric, gasoline-powered or any other type of motor) capable of generating sufficient rotational speeds of one or more propellers or other components to provide thrust and/or lift forces to the aerial vehicle 110. For example, one or more of the motors 122-$n$ may be a brushless direct current ("DC") multi-phase motor such as an outrunner brushless motor or an inrunner brushless motor, and may be aligned or configured to operate with different capacities or ratings, or at different speeds, or coupled to any number of propellers having different sizes and shapes. Additionally, one or more of the motors 122-$n$ may be an electric motor, e.g., a brushless DC multi-phase motor, and one or more of the motors 122-$n$ may be a gasoline-powered motor.

The inertial measurement unit 126 may be one or more components for measuring linear and/or angular motion of the aerial vehicle 110 along or about one or more axes. The inertial measurement unit 126 may include one or more gyroscopes (e.g., mechanical or electrical components or instruments for determining an orientation), one or more accelerometers (e.g., mechanical or electrical components or instruments for sensing or measuring accelerations), one or more compasses or other magnetometers (e.g., mechanical or electrical components or instruments for determining one or more directions with respect to a frame of reference that is fixed with respect to the surface of the Earth), or other components.

Alternatively, or additionally, the inertial measurement unit 126 or the aerial vehicle 110 may include one or more position sensors, or devices, components, systems or instruments that are adapted to receive signals (e.g., trilateration data or information) relating to a position of the aerial vehicle 110 from one or more GPS satellites of a GPS network, from one or more towers or beacons from a cellular telephone network, or from any other source (not shown).

The aerial vehicle 110 may further include any number of other sensors or systems, such as control systems (e.g., one or more electronic speed controls, power supplies, navigation systems and/or payload engagement controllers). The aerial vehicle 110 may further include any number of computer components, e.g., one or more processors, memory components and/or transceivers (not shown), or any other microcontrollers or components for aiding in the determination of accelerations, velocities, positions and/or orientations. The aerial vehicle 110 may also include any number of range sensors that are configured to transmit light along one or more axes or directions, to capture reflections of the light, or to interpret such reflections in order to generate depth images, range profiles or other sets of distances from the aerial vehicle 110 to one or more objects. The aerial vehicle 110 may also be programmed with data representing one or more environment maps (or internal representations), or other sets of distances to objects, or positions of such objects.

As is shown in FIGS. 1B through 1E, as the user 140 carries the aerial vehicle 110 within an indoor space 160 having a dock 150 (or a docking station) in one or more rooms 165-1, 165-2, 165-3, the aerial vehicle 110 may determine a position and an altitude of the aerial vehicle 110, as well as velocities, accelerations or orientations along or about one or more principal axes using the inertial measurement unit 126 or any other onboard sensors.

Each of the rooms 165-1, 165-2, 165-3 of the indoor space 160 may include a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. Additionally, each of the rooms 165-1, 165-2, 165-3 may include or be defined by a number of walls (or other surfaces), which may be aligned at any angle (e.g., vertical, or any non-vertical angle). In some implementations, walls of the rooms 165-1, 165-2, 165-3 may be aligned at common angles (e.g., vertical or non-vertical angles) to one another in their entireties, or joined at edges or other aspects or locations. Alternatively, the rooms 165-1, 165-2, 165-3 may be defined in any other manner and may have any other shape. In some implementations, the aerial vehicle 110 may operate in an outdoor space, or in spaces other than the rooms 165-1, 165-2, 165-3.

In accordance with one or more implementations of the present disclosure, as an aerial vehicle, such as the aerial vehicle 110, travels through an environment either while being carried by a user or flying under its own power, the aerial vehicle continually determines raw data representing a position of the aerial vehicle relative to a coordinate system. The aerial vehicle may determine a position based on an initial position and sensor data, e.g., accelerometer or gyroscope data, which may be captured using an inertial measurement unit, or utilizing a simultaneous localization and mapping (or "SLAM") algorithm, or in any other manner. Localization and mapping may utilize data captured by a time-of-flight sensor, a LIDAR sensor, an imaging device, or any other sensor. For example, distances and angles determined based on data captured by a rotating LIDAR sensor may be utilized to map an environment and determine a set of coordinates indicating a position of the aerial vehicle within the environment, while images captured by one or more cameras or other imaging devices may likewise be used to map the environment and determine a set of coordinates indicating a position of the aerial vehicle therein, such as according to one or more visual or optical SLAM techniques.

Figure 1F:
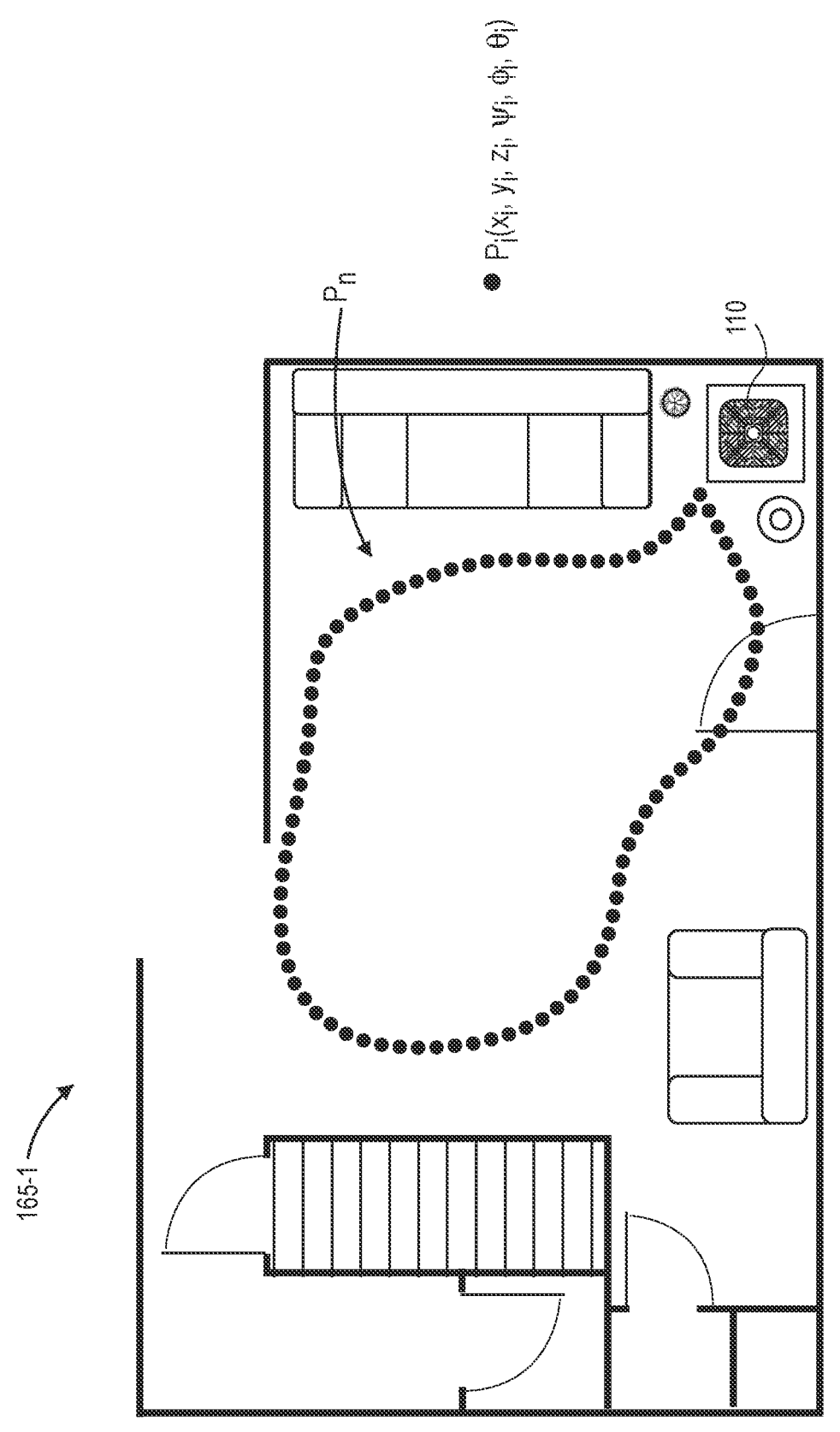

As is shown in FIG. 1F, raw data captured by the aerial vehicle 110 while being carried by the user 140 from the dock 150 and traveling along the path throughout one or more of the rooms 165-1, 165-2, 165-3 before returning to the dock 150 includes, for each point $P_i$ of a plurality of points $P_n$, coordinates $x_i$, $y_i$, $z_i$ of positions and yaw angles $\psi_i$, pitch angles $\phi_i$ and roll angles $\theta_i$ of the aerial vehicle 110 at such points $P_i$, or ($x_i$, $y_i$, $z_i$, $\psi_i$, $\phi_i$, $\theta_i$). Alternatively, in some implementations, the user 140 may select or designate raw data in any other manner. For example, the user 140 may identify one or more points by one or more gestures or other interactions with a map rendered on an interactive touch-screen display. In some other implementations, the user 140 may provide the raw data by carrying a system or device other than the aerial vehicle 110, e.g., a mobile device having position and/or orientation sensors, throughout the indoor space 160.

Figure 1G:
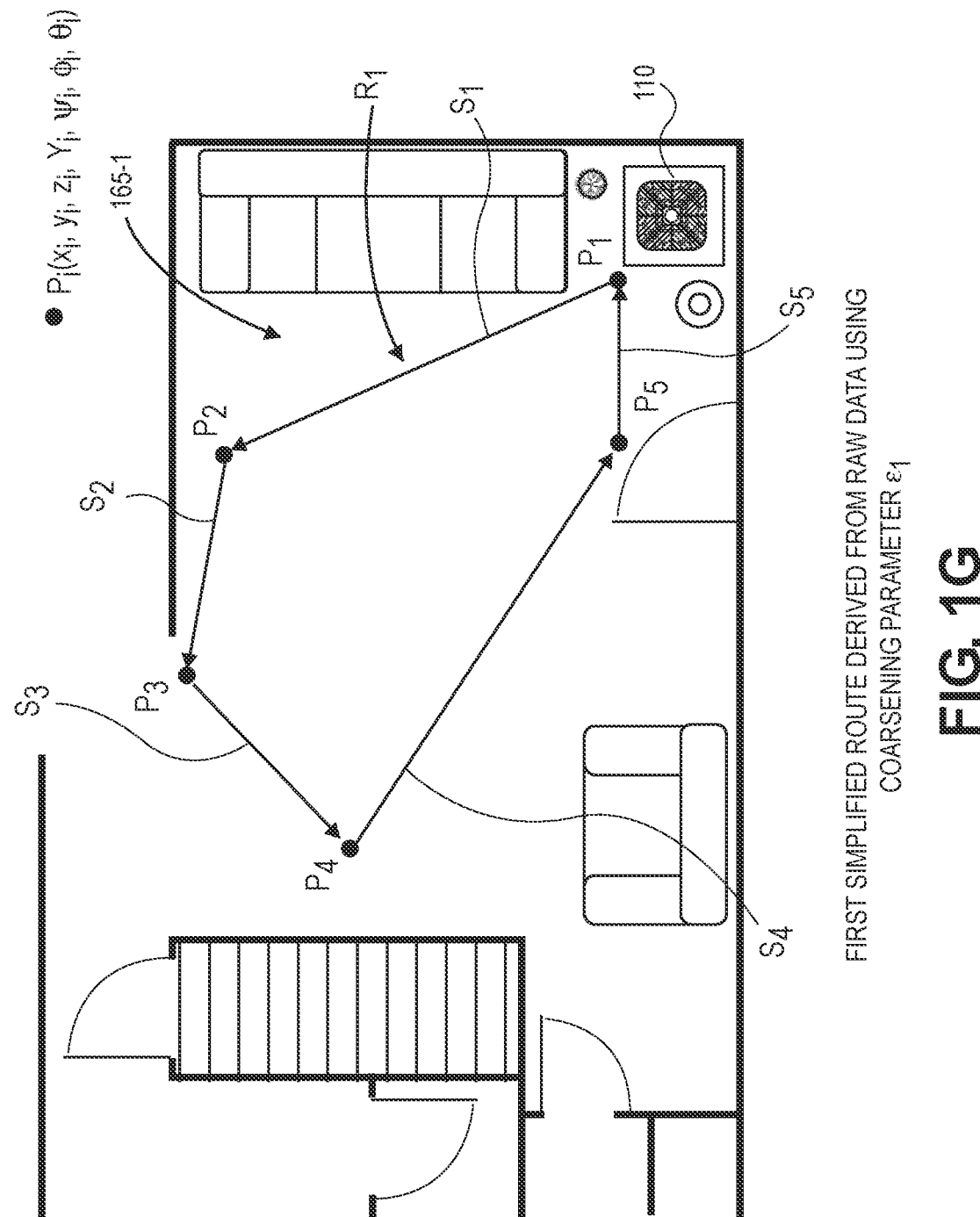

As is shown in FIG. 1G, a simplified route $R_1$ throughout the room 165-1 may be generated for the aerial vehicle 110 based on the plurality of points $P_n$ of raw data shown in FIG. 1F. For example, the simplified route $R_1$ may include a set of the points $P_1$, $P_2$, $P_3$, $P_4$, $P_5$ as well as straight or curvilinear segments $S_1$, $S_2$, $S_3$, $S_4$, $S_5$ between pairs of such points.

In some implementations, the simplified route $R_1$ of FIG. 1G may be generated based on one or more of the points of the plurality of points $P_n$ according to the Douglas-Peucker Algorithm (or the Ramer-Douglas-Peucker Algorithm), or another iterative end-point fit algorithm. For example, one or more of the points $P_n$ may be removed to generate the first simplified route $R_1$ according to a coarsening parameter 1, which may have any value.

First, an initial endpoint of the plurality of points $P_n$ and a final endpoint of the plurality of points $P_n$ are marked for retention, and a recursive algorithm is called with the initial endpoint and the final endpoint as inputs. The recursive algorithm draws a first line segment extending from the initial endpoint to the final endpoint and, for each of the other points $P_n$, between the initial endpoint and the final endpoint, a distance (e.g., a minimum distance) from a point to the first line segment is determined.

A point of the set of points $P_n$ having a greatest deter-mined distance from the first line segment, e.g., a first point of the points $P_n$ that is "farthest" from the first line segment, is identified, and the determined distance of the first point is compared to the coarsening parameter 81. If the determined distance of the first point is less than the coarsening param-eter 81, then a current branch of the recursive algorithm can be terminated. If there are no remaining branches of the recursive algorithm, all points not currently marked for retention may be discarded, and a route defined by all points marked for retention is adjudged a sufficient approximation of the path traveled by the aerial vehicle 110.

If the determined distance of the first point to the first line segment is greater than the coarsening parameter $\varepsilon_1$, then the first point is marked for retention, and the recursive algo-rithm is called twice, once with the initial endpoint and the first point as inputs, to define a second line segment between them, and again with the first point and the final endpoint as inputs, to define a third line segment between them. The recursive algorithm proceeds down branches for each of the second line segment and the third line segment, e.g., to identify a second point having a greatest determined dis-tance from the second line segment, and a third point having a greatest determined distance from the third line segment, and to compare the determined distances for the second point and the third point to the coarsening parameter 81. As discussed above with respect to the first point, if a deter-mined distance of either of the second point or the third point is less than the coarsening parameter 81, then a respective branch of the recursive algorithm is terminated. If a deter-mined distance of either the second point or the third point is greater than the coarsening parameter 81, however, then the second point or the third point is marked for retention, and the recursive algorithm is called again twice, to define line segments, before proceeding down branches for each of the line segments.

For example, in proceeding down a branch taking as inputs the initial endpoint and the first point, the recursive algorithm determines that the second point is farthest from the second line segment between the initial endpoint and the first point. More specifically, the algorithm determines, for each point of the points $P_n$ that is located between the initial endpoint and the first point, and has not already been marked for retention, a distance (e.g., a minimum distance) from that point to the second line segment. A point of the points $P_n$ having a greatest determined distance from the second line segment, e.g., the second point, which is "farthest" from the second line segment, is identified, and the determined dis-tance of the second point is compared to the coarsening parameter 81.

If the determined distance of the second point is less than the coarsening parameter 81, then a current branch of the recursive algorithm can be terminated. If there are no remaining branches of the recursive algorithm, all points not currently marked for retention may be discarded, and a route defined by all points marked for retention is adjudged a sufficient approximation of the path traveled by the aerial vehicle 110.

The recursive algorithm may follow a similar process in proceeding down a branch taking as inputs the first point and the final end point, to determine that the third point is farthest from the third line segment between the first point and the final endpoint, and determining whether distances from any points between the first point and the final end point are less than the coarsening parameter 81.

If the determined distance of the second point is greater than the coarsening parameter 81, then the second point is marked for retention, and the recursive algorithm is called twice, once with the initial endpoint and the second point as inputs, to define a fourth line segment between them, and again with the second point and the first point as inputs, to define a fifth line segment between them. The recursive algorithm proceeds down branches for each of the fourth line segment and the fifth line segment, e.g., to identify a fourth point having a greatest determined distance from the fourth line segment, and a fifth point having a greatest determined distance from the fifth line segment, and to compare the determined distances for the fourth point and the fifth point to the coarsening parameter 81.

Once all branches of the recursive algorithm have been terminated, a simplified route, e.g., the simplified route $R_1$ of FIG. 1G, may be determined to comprise the points marked for retention.

Additionally, in accordance with one or more implemen-tations of the present disclosure, an approach that further takes into account data indicating positions of objects or obstacles within an environment may be utilized.

For example, in some implementations, a Euclidean Dis-tance Transform map may be generated based on an envi-ronment map of an indoor space, e.g., the indoor space 160, which may have been generated or determined based on information or data captured using one or more onboard sensors of an aerial vehicle or any other systems, e.g., imaging devices, time-of-flight sensors, LIDAR sensors, or others. The environment map may have been formed or derived from a point cloud or any other representations of the indoor space, and processed or refined to determined distances to obstacles or other objects within the indoor space accordingly. The environment map, or a Euclidean Distance Transform determined from the environment map, may be a two-dimensional representation of at least a portion of the indoor space that includes, for each of a plurality of points, regions, or cells, a distance from a position in three-dimensional space corresponding to a region or a cell of the environment map or Euclidean Distance Transform map to a nearest obstacle or other object within the indoor space. The points, regions, or cells may have any size, shape or dimension, and may represent distances to nearest objects with any level of resolution.

Figure 1H:
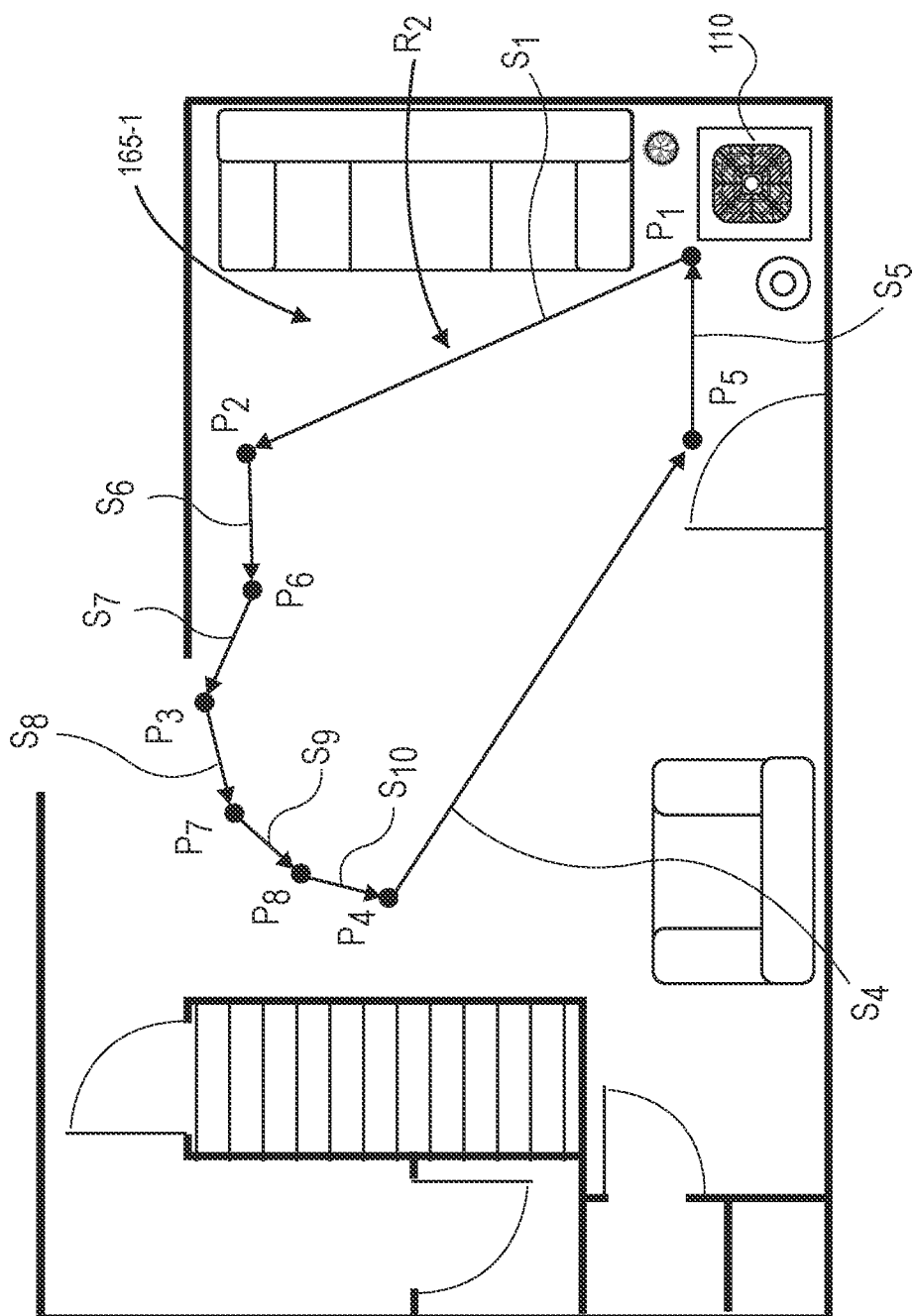
Figure 11:
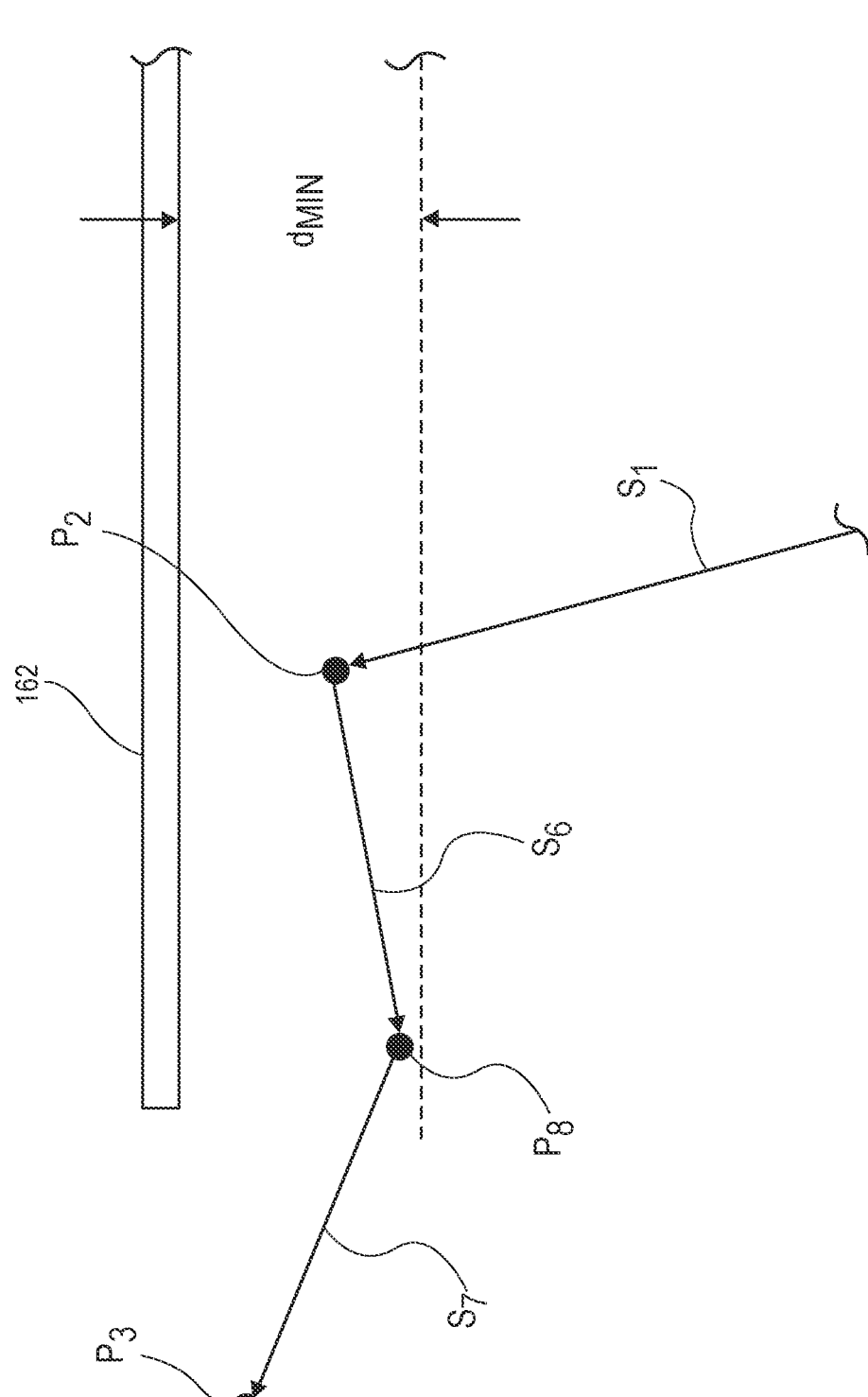

In accordance with one or more implementations of the present disclosure, once a simplified route has been generated based on a route derived from points of raw data captured by an aerial vehicle or selected by a user of the aerial vehicle and the coarsening parameter, segments of the simplified route may be compared to positions of obstacles or other objects within an indoor space. If any of the segments of the simplified route remains beyond a safety distance (or threshold distance) from nearest positions of obstacles or objects, the segments may remain within the simplified route. If any of the segments of the simplified route are within the safety distance from nearest positions of obstacles or objects, however, the segments of the simplified route may be adaptively revised based on a smaller coarsening parameter, resulting in a new simplified route that more closely corresponds to the path traveled by the user, and is thus less simple but also safer, with a lower risk of collision with the obstacles or other objects within the indoor space. As is shown in FIG. 1H, a simplified route $R_2$ throughout the room 165-1 may be generated for the aerial vehicle 110 based on the set of the points $P_1$, $P_2$, $P_3$, $P_4$, $P_5$ as well as new points $P_6$, $P_7$, $P_8$. The simplified route $R_2$ includes the segments $S_1$, $S_4$, $S_5$ of the simplified route $R_1$, as well as a new segment $S_6$ between the point $P_2$ and the point $P_6$, a new segment $S_7$ between the point $P_6$ and the point $P_3$, a new segment $S_8$ between the point $P_3$ and the point $P_7$, a new segment $S_9$ between the new point $P_7$ and the new point $P_8$ and a new segment $S_{10}$ between the new point $P_8$ and the point $P_4$.

A recursive algorithm for generating a simplified route may dynamically adjust a coarsening parameter during execution of the recursive algorithm, to modify a simplified route to account for positions of obstacles or other objects. For example, the simplified route $R_2$ of FIG. 1H may be generated based on one or more of the points $P_1$, $P_2$, $P_3$, $P_4$, $P_5$ and the plurality of points $P_n$ according to the Douglas-Peucker Algorithm (or the Ramer-Douglas-Peucker Algorithm), or another iterative end-point fit algorithm, according to a coarsening parameter 82, which may have any value smaller than a value of the coarsening parameter 81. The process may be recursively repeated until maximum distances of each of the points of the simplified route $R_2$ between the point $P_2$ and the point $P_4$ defined by the raw data are within a distance defined by the coarsening parameter 82.

As is discussed above with regard to the simplified route $R_1$, segments of the simplified route $R_2$ may be compared to positions of obstacles or other objects within the indoor space. If any of the segments of the simplified route $R_2$ remains beyond the safety distance (or threshold distance) from nearest positions of obstacles or objects, the segments may remain within the simplified route $R_2$. If any of the segments of the simplified route $R_2$ is within the safety distance from nearest positions of obstacles or objects, however, such segments may be adaptively revised based on a smaller coarsening parameter, to obtain in a new simplified route. The process may be repeated until a minimum value of the coarsening parameter is reached.

In some implementations, an initial (or maximum) coarsening parameter may have a value of approximately 0.35 meters (or 35 centimeters), and a final (or minimum) coarsening parameter may have a value of approximately 0.15 meters (or 15 centimeters). In some implementations, the value of the coarsening parameter may be iteratively reduced from the initial (or maximum) coarsening parameter by a constant distance or interval, e.g., 0.05 meters (or 5 centimeters), until a simplified route having points and segments beyond the safety distance from obstacles or other objects is obtained, or until the final (or minimum) coarsening parameter is reached.

Once a simplified route having points and segments beyond the safety distance from obstacles or other objects is obtained, points of the simplified route may be further modified to account for risks of collision of each of the points, which may be determined based on distances between segments of the simplified route and any number of obstacles or other objects present within the indoor space 160. If one or more of the points is identified as having a collision risk above an acceptable threshold or limit, such points may be relocated, as necessary, until each of the segments leading into and out of the simplified route has an acceptable level of collision risk.

As is shown in FIG. 1I, the point $P_2$ is identified as having the greatest collision risk of all of the points $P_1$, $P_2$, $P_6$, $P_3$, $P_7$, $P_8$, $P_4$, $P_5$ of the simplified route $R_2$, where a portion of the segment $S_1$ from the point $P_1$ to the point $P_2$ and a portion of the segment $S_6$ from the point $P_2$ to the point $P_3$ each pass within a minimum distance $d_{MIN}$ of a wall 162 within the room 165-1.

Figure 1J:
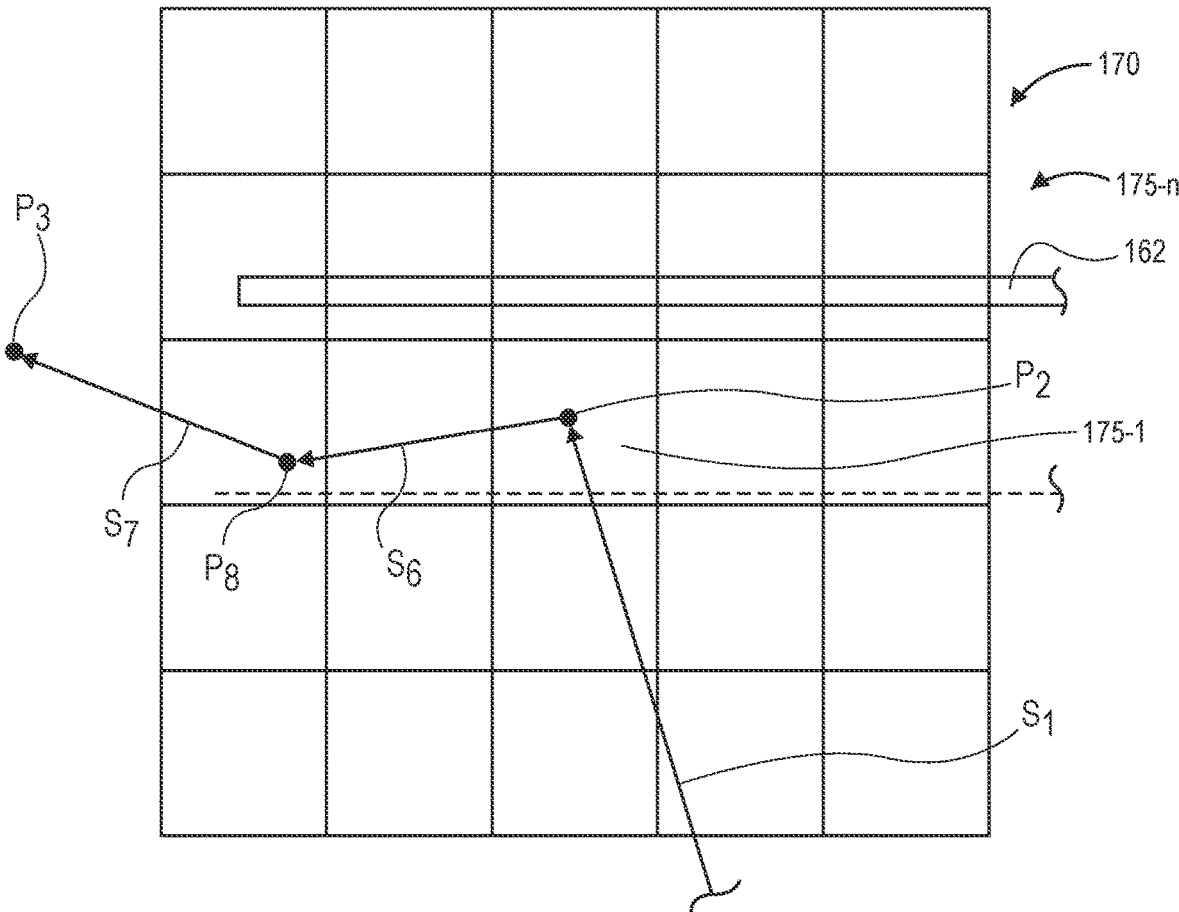

In accordance with implementations of the present disclosure, a point of a route having a greatest collision risk may be relocated to another location in three-dimensional space, which may be selected on any basis. As is shown in FIG. 1J, a grid 170 having a plurality of cells 175-$n$ is applied over the point $P_2$ that was identified as having the greatest collision risk, with the point $P_2$ being located within a cell 175-1 at a center of the grid 170.

The grid 170 may be established in any manner in accordance with implementations of the present disclosure. In some implementations, where an environment map, such as a simultaneous localization and mapping ("SLAM") map, of the indoor space 160 is available, the grid 170 may be formed to include squares or other shapes corresponding to regions in three-dimensional space represented in the environment map, and each of the cells 175-$n$ may have a value corresponding to a distance to a nearest object, or to a level of collision risk associated with each of such cells 175-$n$. For example, in some implementations, a Euclidean Distance Transform map may be established from an environment map of the indoor space 160, which may have been generated or determined based on information or data captured using one or more onboard sensors of the aerial vehicle 110 or any other systems, e.g., imaging devices, time-of-flight sensors, LIDAR sensors, or others. The environment map may have been formed or derived from a point cloud or any other representations of the indoor space 160, and processed or refined to determined distances to obstacles or other objects within the indoor space 160 accordingly. The environment map, or a Euclidean Distance Transform determined from the environment map, may be a two-dimensional representation of at least a portion of the indoor space 160 that includes, for each of a plurality of regions or cells of the map, a distance from a position in three-dimensional space corresponding to a region or a cell of the map to a nearest obstacle or other object within the indoor space 160.

The cells 175-$n$ may have any size, shape or dimension, and may represent such distances to nearest objects with any level of resolution. In some implementations, each of the cells 175-$n$ may be a square having a dimension of five centimeters by five centimeters (or 5 cm×5 cm). Alternatively, the cells 175-$n$ may have any other sizes, shapes or dimensions.

Figure 1K:
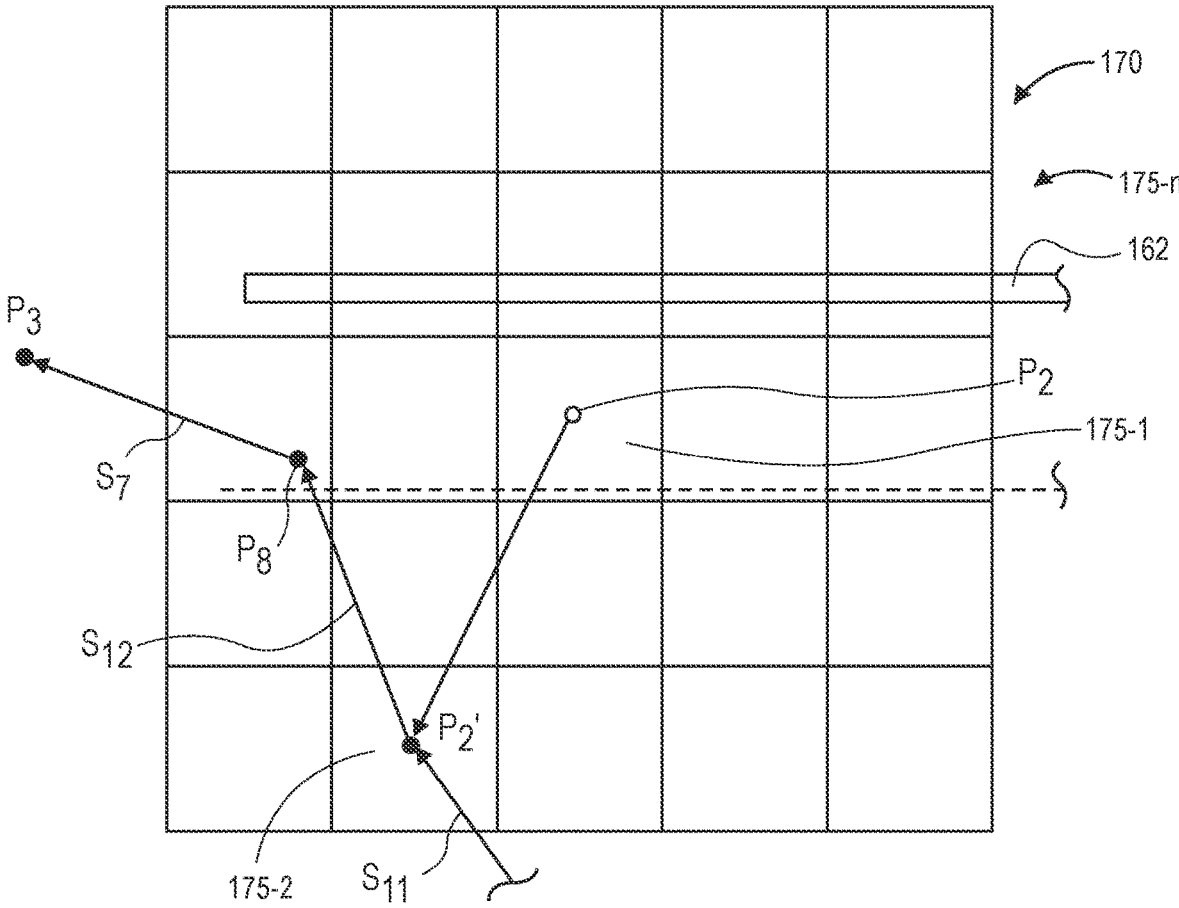

As is shown in FIG. 1K, the point $P_2$ that was identified as having the greatest collision risk is relocated to a point $P_2'$ corresponding to a cell 175-2 of the cells 175-$n$. The cell 175-2 may be selected by calculating, for each of a ring or set of cells immediately surrounding the cell 175-1, a collision risk that would be posed by relocating the point $P_2$ to such cells. For example, for each of the cells surrounding the cell 175-1, a collision risk may be determined by establishing segments from the point $P_1$ to that cell, and from that cell to the point $P_3$, and determining distances between each of such segments and any nearby objects, e.g., the wall 162 or others. If a collision risk of one of the cells surrounding the cell 175-1 is below an acceptable threshold or limit, the point $P_2$ may be relocated to the one of the cells having a lowest collision risk. If none of the cells surrounding the cell 175-1 has a collision risk below an acceptable threshold or limit, collision risks that would be posed by relocating the point $P_2$ to any of another ring or set of cells surrounding the ring or set of cells immediately surrounding the cell 175-1 may be determined. As is shown in FIG. 1K, once the point $P_2$ has been located to the point $P_2'$ within the cell 175-2, a segment $S_{11}$ between the point $P_1$ and the point $P_2'$ and a segment $S_{12}$ between the point $P_3'$ and the point $P_8$ may be calculated.

Figure 1L:
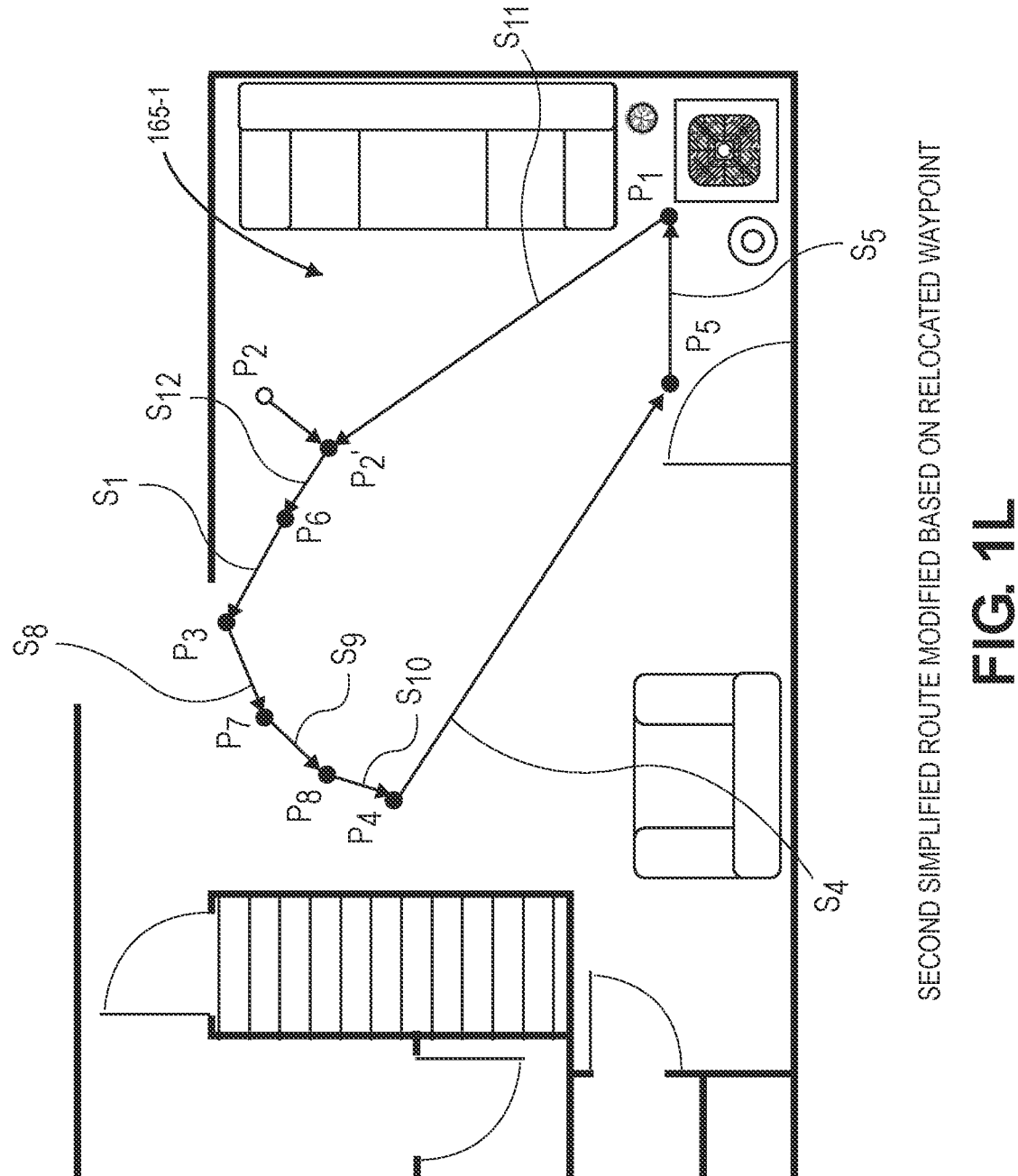

As is shown in FIG. 1L, once the point $P_2$ has been located to the point $P_2'$ within the cell 175-2, the simplified route $R_2$ may be modified to include the repositioned point $P_2'$ and the segments $S_{11}$, $S_{12}$. Subsequently, the aerial vehicle 110 may be programmed to travel along the modified simplified route $R_2$ while performing one or more tasks or missions within the indoor space 160.

One or more of the actions or functions described above with respect to FIGS. 1A through 1L may be performed or executed by processor units provided aboard the aerial vehicle 110, or processor units of any systems in communication with the aerial vehicle 110. Additionally, although FIGS. 1I through 1L show a generation of the simplified route $R_2$ after moving the point $P_2$ in the cell 175-1 to the point $P_2'$ in the cell 175-2, e.g., within a common two-dimensional plane, a point of a route may be relocated from another point in three-dimensional space in accordance with implementations of the present disclosure. For example, in lieu of the two-dimensional grid 170 and the two-dimensional cells 175-$n$ therein, a three-dimensional volume having three-dimensional sub-volumes may be defined, and the point $P_2$ may be relocated from a central sub-volume of the volume to a point $P_2'$ in another sub-volume to minimize a collision risk.

The systems and methods of the present disclosure are directed to the operation of aerial vehicles (e.g., unmanned aerial vehicles, or drones) in any spaces, such as one or more indoor spaces, and determining routes for traveling within such spaces safely, and with a limited risk of collision with one or more obstacles or other objects that may be present within such spaces. The aerial vehicles of the present disclosure may be of any type or form, and may include but need not be limited to low-power drones that may be configured for traveling or performing tasks during operations within indoor spaces.

In some implementations, an aerial vehicle may be configured to calculate or plan trajectories for traveling on routes that rely on maximum speed capacities of the aerial vehicle. For example, where an aerial vehicle is programmed or configured to travel along a route through each of a plurality of waypoints (or spatial points), the aerial vehicle may calculate a trajectory as a set of piece-wise polynomial functions through a plurality of waypoints that represent desired positions of the aerial vehicle in three-dimensional space and minimize snap for the aerial vehicle. The aerial vehicle may adjust its speed according to a calculated risk of collision with any obstacles, and make smooth transitions in speed, while traveling through the various waypoints, with minimized yaw, pitch or roll.

In some implementations, an aerial vehicle may determine whether a trajectory would cause the aerial vehicle to come into contact with one or more known obstacles while traveling between waypoints. If the aerial vehicle determines that the trajectory would cause the aerial vehicle to come into contact with or pass unacceptably close to an obstacle between a pair of waypoints, the aerial vehicle may insert an additional waypoint (e.g., an intervening waypoint at a midpoint between the pair of waypoints), and recalculate a trajectory that causes the aerial vehicle to pass through the additional waypoint. If the recalculated trajectory would cause the aerial vehicle to pass the obstacle at a safe distance, the aerial vehicle may proceed along the recalculated trajectory.

In some implementations, an aerial vehicle may determine whether a distance between any of a pair of waypoints is sufficiently long to enable the aerial vehicle to accelerate to a maximum speed upon departing from one of the waypoints and to decelerate from the maximum speed prior to arriving at another of the waypoints. If the aerial vehicle may both accelerate to and decelerate from a maximum speed between a pair of waypoints, the trajectory may be calculated to include a first intervening waypoint located at a minimum acceleration distance from one of the waypoints of the pair and a second intervening waypoint located at a minimum deceleration distance from another of the waypoints of the pair. The aerial vehicle may thus travel at the maximum speed between the first intervening waypoint and the second intervening waypoint.

In some implementations, an aerial vehicle may be outfitted or equipped with one or more modules, e.g., hardware components or software applications to be executed by one or more hardware components. Such modules may include an obstacle detection module that may assess relative positions of obstacles in a given environment, using temporal information to fuse data received from range sensors provided aboard the aerial vehicle, e.g., a rotating two-dimensional LIDAR sensor and time-of-flight sensors provided in fixed orientations with respect to a frame, a fuselage or another component of the aerial vehicle. Additionally, an environment map, a point cloud or another representation may be subject to pixelization to determine whether any obstacles are present, and to minimize computation resources and processing power.

The aerial vehicles of the present disclosure may be outfitted with one or more processors, components, transceivers, sensors or other systems for engaging in communications with aspects of a facility (e.g., appliances, lighting, environmental or other systems), as well as any persons within the facility. For example, an aerial vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth®, radio frequency identification (or "RFID"), near-field communication (or "NFC") readers, or any other type of systems or protocols. For example, the aerial vehicles may further include any number of audio or video sensors, including but not limited to one or more imaging devices (e.g., digital cameras) and/or microphones, or any other type of sensors, embedded or incorporated therein.

Additionally, an aerial vehicle may further include any number of sensors, such as imaging devices (e.g., cameras configured to capture visual or depth data), temperature sensors, magnetometers, Wi-Fi receivers, Bluetooth® receivers, or others, and may be programmed or configured to travel throughout one or more spaces of a facility and to capture data using such sensors. Based on the captured data, an environment map (or internal representation) of such spaces or the facility may be generated. The environment map may identify or depict one or more boundaries (e.g., walls, ceilings, floors) or other aspects of such spaces, as well as the respective dimensions of such spaces, or the respective surfaces or textures of such boundaries. In some embodiments, an aerial vehicle may autonomously travel throughout one or more spaces of a facility in order to capture data using one or more sensors, and such data may be utilized in generating an environment map of the spaces of the facility. In some other embodiments, an aerial vehicle may be transported (e.g., carried) or escorted by a human actor throughout such spaces, and may capture data using one or more sensors as the aerial vehicle is transported or escorted throughout such spaces. Data captured as the aerial vehicle when escorted may be utilized in generating an environment map of the spaces of the facility. Additionally, in some embodiments, the aerial vehicle may selectively operate one or more propulsion motors as the aerial vehicle is transported or otherwise escorted throughout such spaces, in order to maintain altitude and/or tilt control. Furthermore, in some embodiments, data captured by the aerial vehicle as the aerial vehicle travels throughout the spaces of the facility may be adjusted to account for presence of one or more body parts of a human actor that is transporting or otherwise escorting the aerial vehicle through the facility, as well as amplitudes or frequencies of audio signals that may be present throughout the facility.

In accordance with some embodiments of the present disclosure, an aerial vehicle may be configured to operate along with one or more stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a frame or a fuselage of the aerial vehicle, and to enable the aerial vehicle to be aligned in one of a plurality of alignments or orientations with respect to the base component, the charging dock or intermediary device.

Moreover, aerial vehicles of the present disclosure may be configured for use or operation within facilities of any kind.

As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

Figure 2:
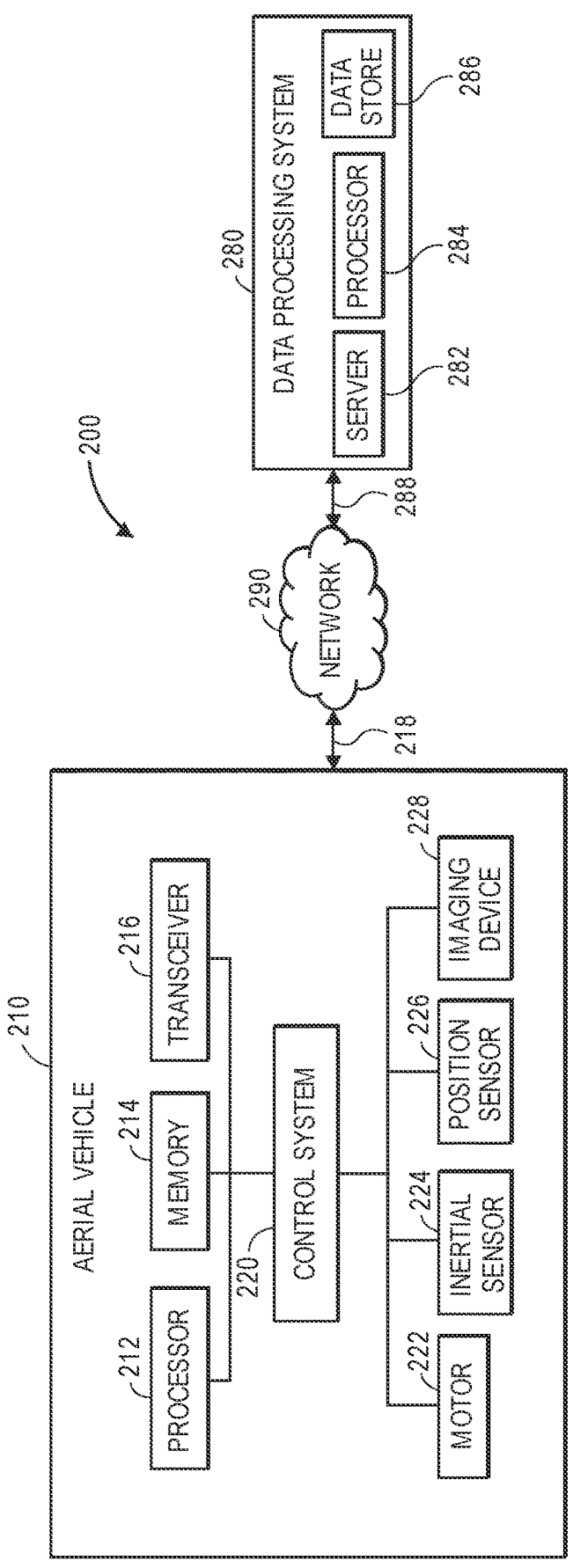
FIG. 2 is a block diagram of one system for route planning in accordance with embodiments of the present disclosure.

Referring to FIG. 2, a block diagram of one system for route planning in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1L.

The aerial vehicle 210 includes a processor 212, a memory 214 and a transceiver 216. The aerial vehicle 210 further includes a control system 220, a plurality of propulsion motors 222, an inertial sensor 224, a position sensor 226 and an imaging device 228.

The processor 212 may be configured to perform any type or form of computing function associated with the operation of the aerial vehicle 210, including but not limited to the execution of one or more algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the inertial sensor 224, the position sensor 226 and/or the imaging device 228.

The processor 212 may also control the operation of one or more control systems or modules, such as the control system 220, for generating instructions for conducting operations of one or more of the propulsion motors 222, the inertial sensor 224, the position sensor 226 and/or the imaging device 228, or for interpreting information or data captured by one or more onboard sensors, e.g., the inertial sensor 224, the position sensor 226 and/or the imaging device 228, or others (not shown). Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a central processing unit ("CPU"), graphics processing unit ("GPU") or a neural processing unit ("NPU") having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/ output (or "I/O") interfaces, network interfaces and/or input/ output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the inertial sensor 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the inertial sensor 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216, and configured to receive commands or generate and provide status updates of propeller speeds, as well as times and lengths of any adjustments.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The inertial sensor 224 may include one or more components for measuring linear and/or angular motion of the aerial vehicle 210. The inertial sensor 224 may include one or more gyroscopes (e.g., mechanical or electrical components or instruments for determining an orientation), one or more accelerometers (e.g., mechanical or electrical components or instruments for sensing or measuring accelerations), one or more compasses or other magnetometers (e.g., mechanical or electrical components or instruments for determining one or more directions with respect to a frame of reference that is fixed with respect to the surface of the Earth), or other components.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), acoustic sensors, attitude indicators, depth gauges, accelerometers, or sound sensors (e.g., microphones, piezoelectric sensors, vibration sensors or other transducers for detecting and recording acoustic energy from one or more directions).

Although the block diagram of the system 200 shown in FIG. 2 includes a single box for a propulsion motor 222, a single box for an inertial sensor 224, a single box for a position sensor 226 and a single box for an imaging device 228, those of ordinary skill in the pertinent arts will recognize that any number or type of propulsion motors, altimeters, position sensors and/or imaging devices may be provided aboard the aerial vehicle 210 in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to signals transmitted by the aerial vehicle 210, along with times and relative distances to objects or estimated positions of the aerial vehicle 210 at which energy including reflections of such signals was received, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding maps, cartographic representations, or statuses of propellers or sensors, for any purpose.

The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to generate two-dimensional or three-dimensional maps or other representations of locations of objects. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, or any other intrinsic or extrinsic factors, such as according to one or more traditional shortest path or shortest route algorithms.

The aerial vehicle 210 and/or the data processing system 280 may use any applications, features, or techniques to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU, a GPU or an NPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the functions, calculations, determinations or other processing steps described herein may be performed locally, e.g., by one or more computer processors provided aboard an aerial vehicle, or remotely, e.g., by one or more computer systems in communication with an aerial vehicle. In some other implementations, one or more processors provided in association with an external computer system in communication with an aerial vehicle, e.g., the servers 282, may interpret distances, bearings or ranges to objects and construct an environment map (or internal representation) of a space or area in which the aerial vehicle operated based on such distances, bearings or ranges. Alternatively, any of such functions, calculations, determinations or other processing steps may be performed aboard the aerial vehicle or by one or more back-end systems.

Figure 3:
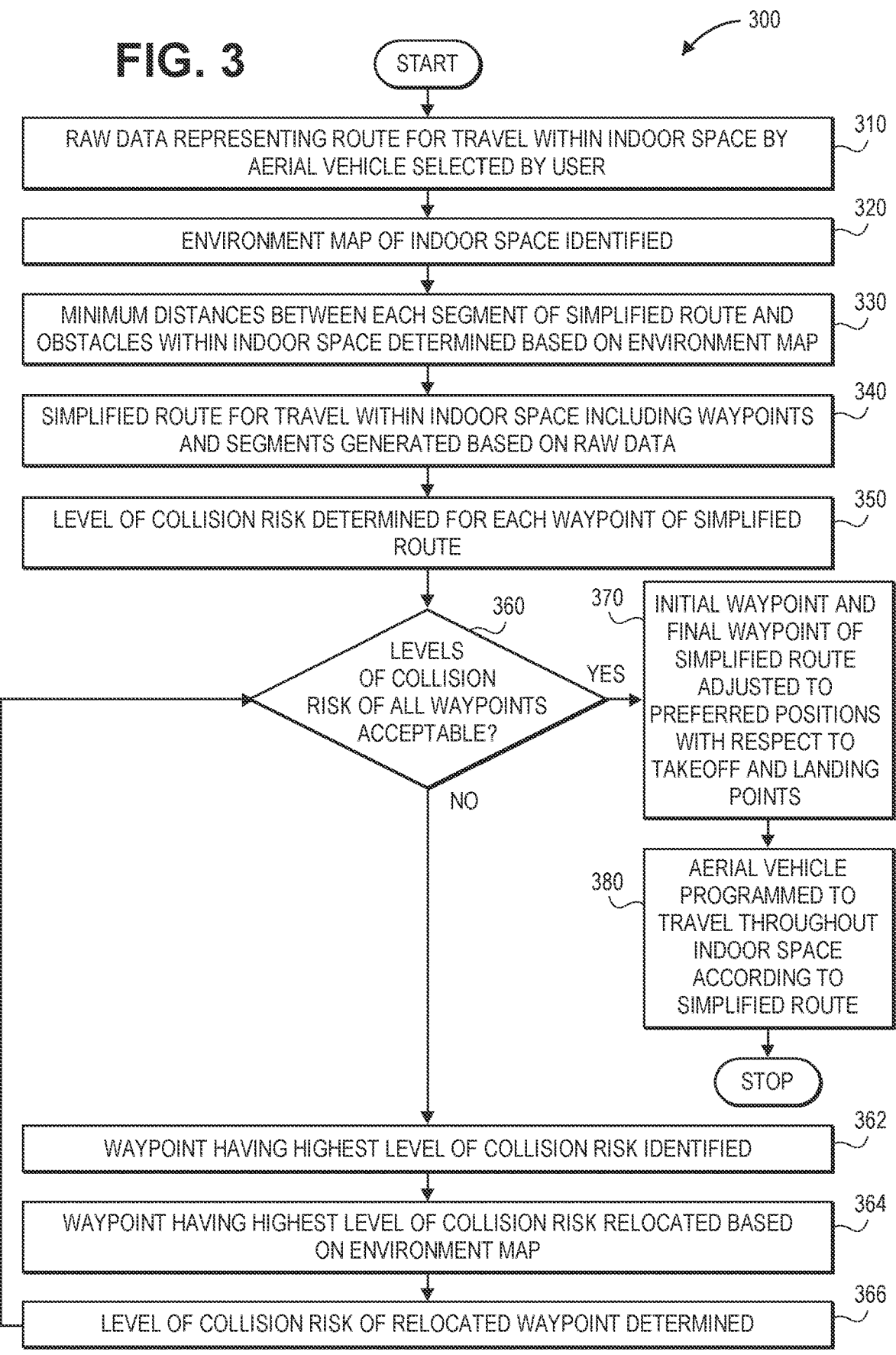
FIG. 3 is a flow chart of one process for route planning in accordance with embodiments of the present disclosure.

Referring to FIG. 3, a flow chart 300 of one process for route planning in accordance with embodiments of the present disclosure is shown.

At box 310, raw data representing a path traveled by an aerial vehicle within an indoor space is selected by a user.

The raw data may include or represent positions of the aerial vehicle along the path within the indoor spaces at various points, e.g., coordinates in three-dimensional space, as well as orientations of the aerial vehicle, e.g., yaw angles, pitch angles, roll angles, or other representations or indicia.

For example, in some implementations, where the aerial vehicle is outfitted or equipped with an inertial measurement unit or other form of position or orientation sensors, a human operator may grasp the aerial vehicle by hand and walk around the indoor space along the path, and manually guide the aerial vehicle to positions within the indoor space where the human operator intends for the aerial vehicle to travel during the performance of one or more missions or tasks. In some other implementations, the human operator may grasp a mobile device or other system outfitted with an inertial measurement unit or other position or orientation sensors, and walk around the indoor space along the path while manually guiding the mobile device to positions within the indoor space where the human operator intends for an aerial vehicle to travel during the performance of missions or tasks.

In still other implementations, the human operator may provide or select the raw data by one or more gestures or other interactions with a computer device or system, such as by contact with an interactive touchscreen, or in any other manner. For example, in some implementations, a representation of a layout or design of the indoor space may be rendered on a touchscreen display, and the human operator may designate a path by contact with the touchscreen display using a finger, a stylus, or any other object or tool. Where the representation is a two-dimensional view (e.g., a top view) of the indoor space rendered on a touchscreen display, the human operator may designate a path for the aerial vehicle within a plane of the representation, and designate an altitude and/or a yaw angle, a pitch angle or a roll angle of the aerial vehicle by one or more other input/output devices (e.g., keyboard, mouse, voice commands), or in any other manner.

The aerial vehicle may be outfitted with any number of motors, propellers (or rotors), control surfaces or any other components, such as one or more range sensors (or other imaging devices), any of which may be a time-of-flight sensor, a LIDAR sensor, an imaging device, or any other type or form of sensors. The indoor space may include one or more rooms such as a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. The indoor space may be bounded by walls, a ceiling or another upper boundary, as well as a floor or another lower boundary. The ceiling or the floor may be aligned horizontally or at any other angle with respect to one another. Alternatively, the aerial vehicle may operate outdoors or in any location or area other than an indoor space.

At box 320, a three-dimensional environment map of the indoor space is identified. In some implementations, the environment map may be a point cloud or another set of data or representation of positions of surfaces of objects within the indoor space that may be filtered or otherwise processed to smooth or refine such positions. The environment map may have been generated based on data captured by one or more sensors provided aboard the aerial vehicle, or by any other systems, and programmed into one or more data stores or other memory components provided aboard the aerial vehicle.

In some implementations, the environment map may be used to generate a Euclidean Distance Transform map of the indoor space. The Euclidean Distance Transform map may include, for each of a plurality of regions or cells of the map, a distance from a position in three-dimensional space corresponding to a region or a cell of the map to a nearest obstacle or other objects within the indoor space. Regions or cells of Euclidean Distance Transform maps may have any dimensions or may represent distances to nearest objects with any level of resolution.

At box 330, minimum distances are determined between each segment of the route and obstacles or other objects within the indoor space based on the three-dimensional environment map. For example, the minimum distances may be determined based on minimum values of all region or cells of a Euclidean Distance Transform through which segments of the route pass. Alternatively, the minimum distances may be determined in any other manner.

At box 340, a simplified route for travel within the indoor space that includes waypoints and segments is generated based on the raw data selected by the user at box 310. For example, where the raw data includes a plurality of points in three-dimensional space within the indoor space, the simplified route may be generated by adding points to the route, removing points from the route, or relocating one or more points within the route.

In some implementations, the simplified route may be generated based on the raw data according to an iterative end-point fit algorithm, such as the Douglas-Peucker Algorithm (or the Ramer-Douglas-Peucker Algorithm), which may smooth a path defined by the raw data by reducing a number of points along the route, according to a coarsening parameter, or $\varepsilon$, that defines a maximum distance between each of such points and the simplified route. For example, where a route $R_1$ defined by raw data includes an ordered set of points $P_1 \ldots P_n$, a line segment extending from an initial endpoint $P_1$ to a final endpoint $P_n$ may be drawn. Where a point $P_m$ of the ordered set of points $P_1 \ldots P_n$ is identified as having a maximum distance $d_{MAX}$ from the line segment drawn between the point $P_1$ and the point $P_n$, the maximum distance $d_{MAX}$ is compared to the coarsening parameter $\varepsilon$. If the maximum distance $d_{MAX}$ is less than the coarsening parameter $\varepsilon$, then the line segment drawn between the point $P_1$ and the point $P_n$ may stand as a simplified route without further modification. If the maximum distance $d_{MAX}$ is greater than the coarsening parameter &, however, then one new line segment may be drawn between the point $P_1$ and the point $P_m$, and another new line segment may be drawn between the point $P_m$ and the point $P_n$, and the process may be recursively repeated until maximum distances of each of the points of the route defined by the raw data are within a distance defined by the coarsening parameter from the simplified route.

A coarsening parameter $\varepsilon$ may have any value in accordance with the present disclosure. In some implementations, a coarsening parameter $\varepsilon$ may have a value of approximately 0.35 meters (or 35 centimeters).

In some implementations, once a simplified route has been generated according to the Douglas-Peucker Algorithm (or the Ramer-Douglas-Peucker Algorithm) using an initial (or maximum) coarsening parameter, positions of each of the points of the simplified route, or segments between pairs of such points, may be compared to positions of obstacles or other objects in three-dimensional space. If any of the points or segments is determined to be within a safety threshold distance from any obstacles or other objects, that segment may be calculated again according to the Douglas-Peucker Algorithm (or the Ramer-Douglas-Peucker Algorithm), using a coarsening parameter that is smaller in value than the initial coarsening parameter, e.g., reduced by a predetermined interval or value, until a minimum (or final) value. For example, where the simplified route is initially determined based on the raw data and a coarsening parameter of 0.35 meters (or 35 centimeters), and a segment of the simplified route passes within a safety distance of an object, that segment may be calculated again based on the raw data using a coarsening parameter of 0.30 meters (or 30 centimeters).

In some implementations, the safety distances may be the same value as the initial coarsening parameter. Alternatively, the safety distance need not bear any relation to a value of the initial coarsening parameter.

In some implementations, a recursive algorithm may be utilized which generates a simplified route based on dynamic adjustment of a coarsening parameter & during execution of the recursive algorithm.

At box 350, a level of collision risk is determined for each of the waypoints of the simplified route based on the minimum distances for segments associated with each of the waypoints. For example, a level of collision risk for a waypoint may be calculated based on minimum distances calculated at box 330 for both a segment entering the waypoint and a segment departing the waypoint. Alternatively, or additionally, the level of collision risk may be defined in any manner with respect to a course, a speed or an altitude of the aerial vehicle, or any other factors affecting a risk of collision within the indoor space (e.g., a number of humans or other aerial vehicles within the indoor space), or on any other basis.

At box 360, whether levels of collision risk of each of the waypoints of the simplified route are acceptable (e.g., within a predetermined threshold) is determined. In some implementations, a level of collision risk of a waypoint may be deemed unacceptable where either or both of the segments pass within a predetermined distance of one or more obstacles or other objects within the indoor space. If a level of collision risk of any of the waypoints of the simplified route is not acceptable, then the process advances to box 362, where a waypoint having a highest level of collision risk is identified.

At box 364, the waypoint having the highest level of collision risk is relocated based on the three-dimensional environment map. For example, in some implementations, a grid or an array may be constructed with values from the three-dimensional environmental map, or from a Euclidean Distance Transform map, and centered on the waypoint identified as having the highest level of collision risk at box 362. The cells of the grid or the array may have any size or dimension. For example, in some implementations, a five cell-by-five cell grid, or a grid having any other number of cells, may be applied on or over the waypoint identified as having the highest level of collision risk at box 362. The waypoint may be relocated from a center cell of the grid to one of the cells surrounding the center cell. Alternatively, the waypoint may be relocated to any of the other cells of the grid.

At box 366, a level of collision risk is determined for the relocated waypoint based on the three-dimensional environment map. For example, where a position of the waypoint has been moved from one cell of a grid to another cell of the grid, a level of collision risk is determined for the relocated waypoint based on the minimum distances for segments associated with the relocated waypoint in its new location. The level of collision risk for the relocated waypoint may be calculated based on minimum distances for both a segment entering the relocated waypoint and a segment departing the relocated waypoint.

The process then returns to box 360, where whether levels of collision risk of each of the waypoints of the simplified route, including the relocated waypoint, are acceptable is determined.

If the levels of collision risk of each of the waypoints of the simplified route are determined to be acceptable at box 360, then the process advances to box 370, where an initial waypoint and a final waypoint of the simplified route are adjusted to preferred positions with respect to the takeoff and landing points. For example, in some implementations, where an initial waypoint corresponding to a location from which the aerial vehicle is expected to take off, e.g., from a dock or docking station, is below a predetermined altitude or is not positioned above the location, the initial waypoint may be relocated to a position above the location, or another waypoint in the position above the location may be added to the simplified route. Similarly, where a final waypoint corresponding to a location at which the aerial vehicle is expected to land, e.g., onto a dock or docking station, the final waypoint may be relocated to a position above the location, or another waypoint in the position above the location may be added to the simplified route.

At box 380, the aerial vehicle is programmed to travel throughout the indoor space according to the simplified route, and the process ends. For example, in some implementations, the aerial vehicle may be programmed with the points of the simplified route and configured to calculate trajectories for traveling along the simplified route within the indoor space, or to modify the simplified route upon detecting any number of obstacles or other objects, and to take any corrective actions as necessary.

Referring to FIGS. 4A through 4G, views of aspects of one system for route planning in accordance with embodiments of the present disclosure are shown. Except where otherwise noted, reference numerals preceded by the number "4" shown in FIGS. 4A through 4G indicate components or features that are similar to components or features having reference numerals preceded by the number "2" shown in FIG. 2 or by the number "1" shown in FIGS. 1A through 1L.

Figure 4A:
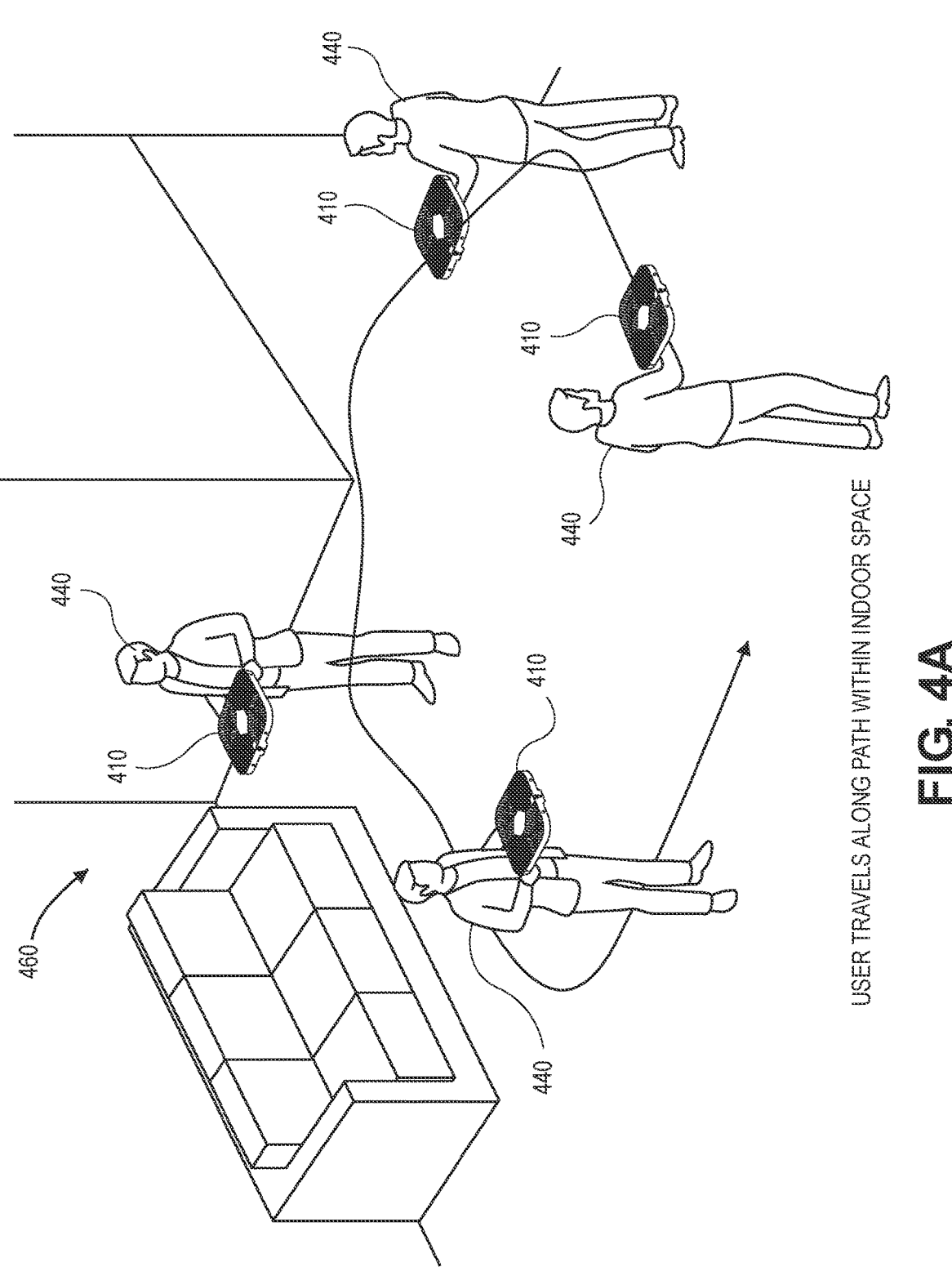
FIGS. 4A through 4G are views of aspects of one system for route planning in accordance with embodiments of the present disclosure.

As is shown in FIG. 4A, an aerial vehicle 410 (e.g., a drone) is carried by a user 440 (e.g., a human operator) throughout an indoor space 460, which may be any space including one or more rooms. The aerial vehicle 410 may be outfitted with one or more position sensors or orientation sensors, such as an inertial measurement unit, which may be configured to detect changes in velocities and/or accelerations along or about one or more axes as the aerial vehicle 410 is carried throughout the indoor space 460.

Figure 4B:
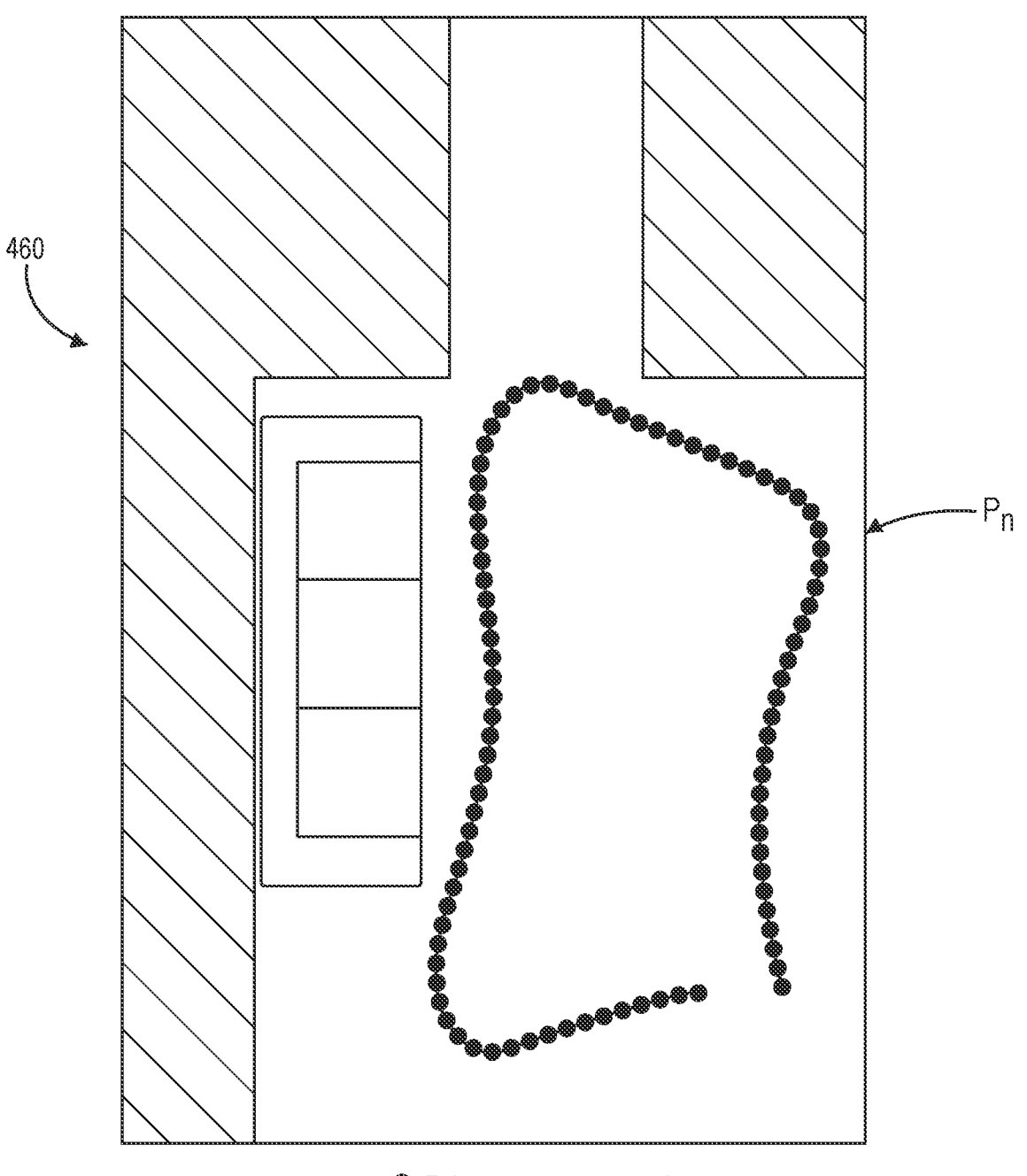

As is shown in FIG. 4B, raw data captured by the aerial vehicle 410 as the aerial vehicle 410 is carried throughout the indoor space 460 includes, at each point $P_i$ of a plurality of points $P_n$, coordinates $x_i$, $y_i$, $z_i$ of positions and yaw angles $\psi_i$, pitch angles $\phi_i$ and roll angles $\theta_i$ of the aerial vehicle 410 at such points $P_i$, or $(x_i, y_i, z_i, \psi_i, \phi_i, \theta_i)$.

Figure 4C:
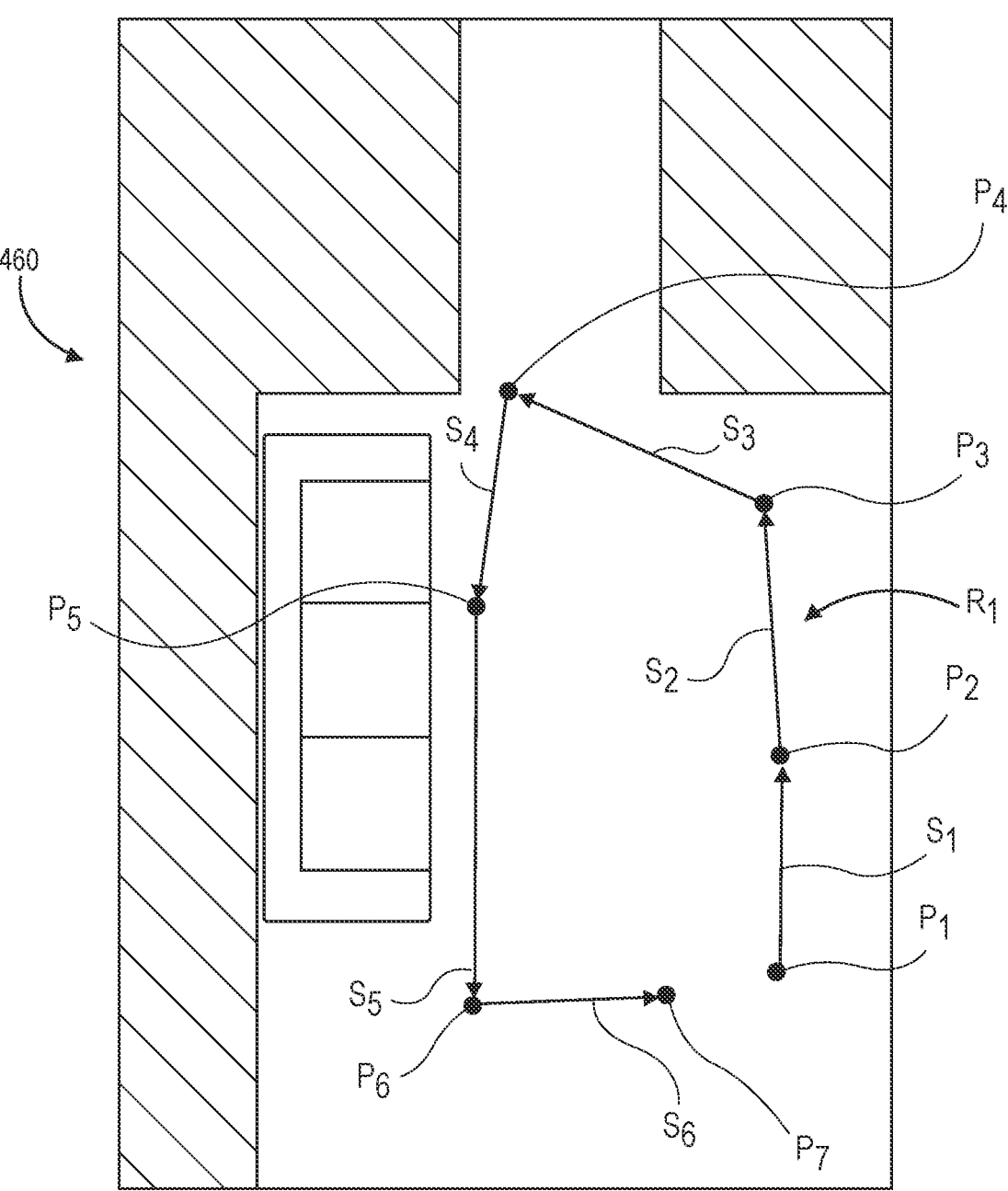

As is shown in FIG. 4C, a simplified route $R_1$ is determined from the raw data of FIG. 4B using an iterative fit algorithm, such as the Douglas-Peucker Algorithm (or the Ramer-Douglas-Peucker Algorithm), which may smooth the path traveled by the user 440 as sensed by the aerial vehicle 410 by reducing a number of points to define the simplified route $R_1$ according to a coarsening parameter. For example, as is shown in FIG. 4C, the simplified route $R_1$ includes the points $P_1$, $P_2$, $P_3$, $P_4$, $P_5$, $P_6$, $P_7$ from the raw data, and segments $S_1$, $S_2$, $S_3$, $S_4$, $S_5$, $S_6$, between such points.

Figure 4D:
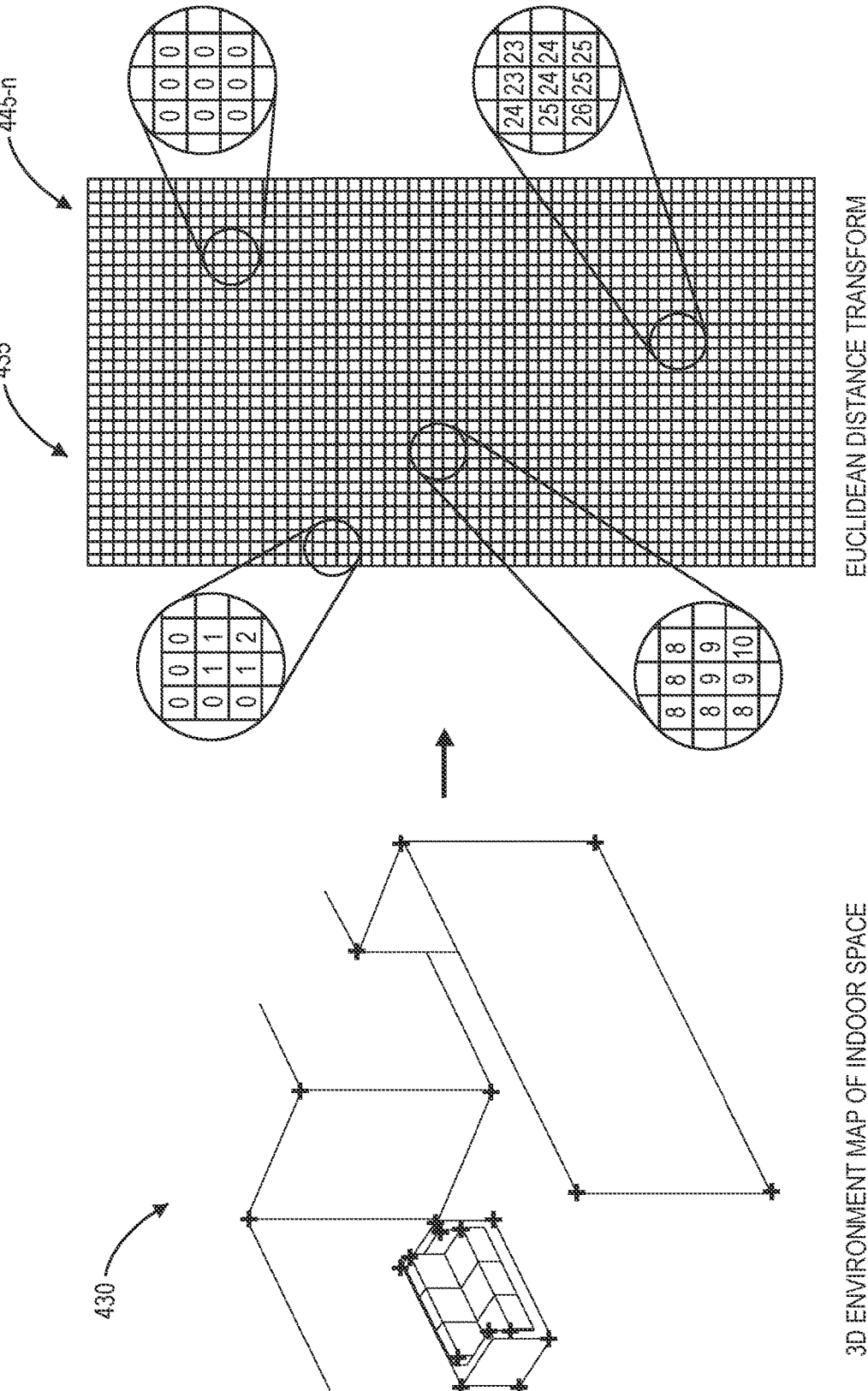

One or more of the points $P_1$, $P_2$, $P_3$, $P_4$, $P_5$, $P_6$, $P_7$ of the simplified route $R_1$ may be relocated, as necessary, to reduce a collision risk of the aerial vehicle 410 when traveling through the indoor space 460. For example, as is shown in FIG. 4D, where an environment map 430 of the indoor space 460 is derived from a point cloud or any other set of three-dimensional data representing positions of obstacles or other objects within the indoor space 460, the environment map 430 may be used to generate a Euclidean Distance Transform map 435 having a plurality of cells 445-$n$. Each of the cells 445-$n$ may represent a portion of a two-dimensional plane corresponding to the indoor space 460 and having fixed dimensions, and may include a value representing a distance from the portion of the two-dimensional plane to a nearest obstacle or other object within the indoor space 460. For example, as is shown in FIG. 4D, cells of the Euclidean Distance Transform map 435 that are near, adjacent to or beyond walls or other surfaces of the indoor space 460 have low values, e.g., zero, while cells of the Euclidean Distance Transform map 435 that are remote or distant from such walls or other surfaces have substantially greater values.

The cells 445-$n$ may have any size, shape or dimensions. For example, in some implementations, each of the cells 445-$n$ may be a square having a dimension of five centimeters by five centimeters (or 5 cm×5 cm). Moreover, although the Euclidean Distance Transform map 435 is shown as a two-dimensional array, the systems and methods of the present disclosure are not so limited. For example, in lieu of the EDT435, a three-dimensional representation of a portion of the indoor space 460 may include three-dimensional cells having fixed dimensions that include values representing distances from such portions of the three-dimensional representation to a nearest obstacle or other object within the indoor space 460.

Figure 4E:
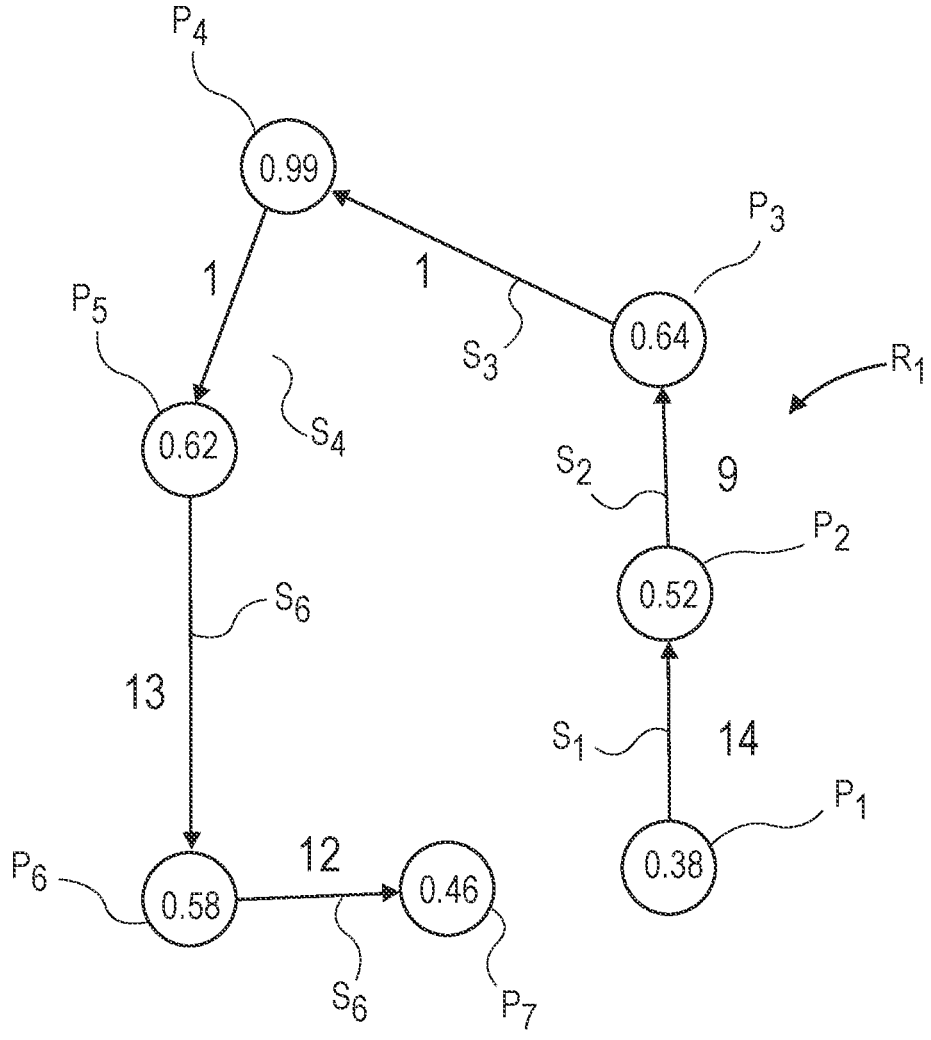

Levels of collision risk of each of the points $P_1$, $P_2$, $P_3$, $P_4$, $P_5$, $P_6$, $P_7$ of the simplified route $R_1$ may be calculated based on the environment map 430 in general, or the Euclidean Distance Transform map 435 in particular. For example, as is shown in FIG. 4E, average or minimum distances between the segments $S_1$, $S_2$, $S_3$, $S_4$, $S_5$, $S_6$ of the simplified route $R_1$ and obstacles or other objects within the indoor space 460 may be calculated using the Euclidean Distance Transform map 435, and levels of collision risk for the aerial vehicle 410 associated with such points may be derived based on such average or minimum distances. For example, where the segment $S_1$ leading from the point $P_1$ to the point $P_2$ and the segment $S_6$ leading from the point $P_5$ to the point $P_6$ of the simplified route $R_1$ have the greatest average or minimum distances from obstacles or other objects such as walls, levels of collision risk associated with such points $P_1$, $P_6$ are substantially low, viz., 0.38 and 0.58, respectively. Conversely, because the segments $S_3$, $S_4$ leading from the point $P_3$ to the point $P_4$ and from the point $P_4$ to the point $P_5$, respectively, have the smallest average or minimum distances to obstacles or other objects, viz., 1, a level of collision risk associated with the point $P_4$ is substantially high, viz., 0.99, and the greatest of all of the points $P_1$, $P_2$, $P_3$, $P_4$, $P_5$, $P_6$, $P_7$ of the simplified route $R_1$.

Figure 4F:
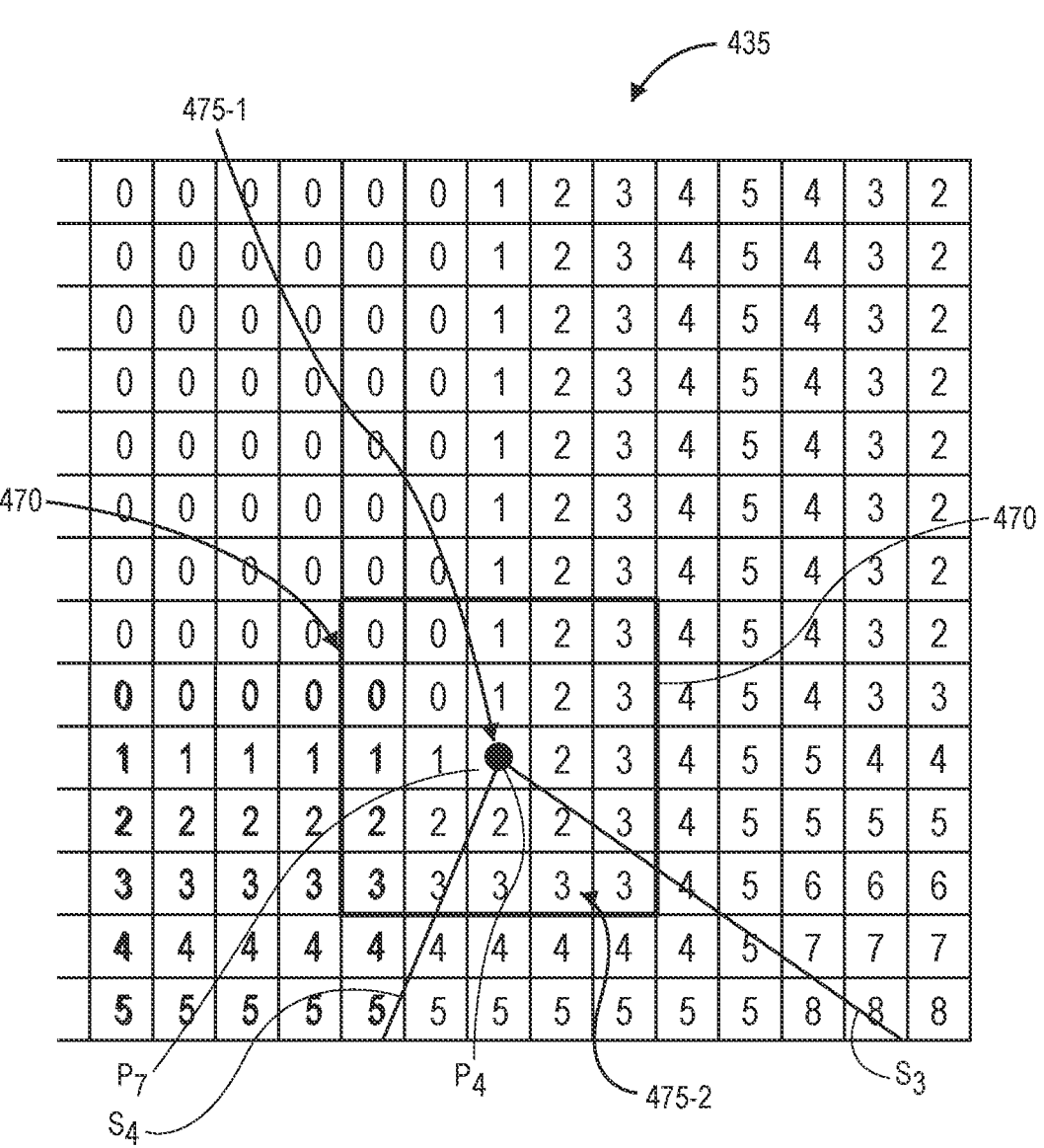

The Euclidean Distance Transform map 435 may be used to identify a location to which the point $P_4$ may be relocated in order to reduce the level of collision risk of the point $P_4$ to an acceptable level. As is shown in FIG. 4F, a grid 470 including a plurality of the cells of the Euclidean Distance Transform map 435 may be applied over a location of the point $P_4$, with the point $P_4$ being located within a central cell 475-1 of the grid 470. In accordance with implementations of the present disclosure, levels of collision risk of each of a nearest ring or set of cells surrounding the central cell 475-1 may be calculated to determine whether relocating the point $P_4$ to any of such cells would result in an acceptable collision risk for the aerial vehicle 410. For example, for each of the cells that immediately surround the central cell 475-1, average or minimum distances between segments leading from the points $P_3$, $P_5$ and into and out of each of such cells and obstacles may be calculated based on the grid 470, and such distances may be used to determine a level of collision risk associated with relocating the point $P_4$ to each of such cells. If relocating the point $P_4$ to any of the cells would result in an acceptable level of risk, then the point $P_4$ may be relocated to one of such cells. If relocating the point $P_4$ to any of the cells would not result in an acceptable level of collision risk, however, then levels of collision risk of each of another ring or set of cells surrounding that nearest ring or set of cells may be determined in a similar manner.

As is further shown in FIG. 4F, where relocating the point $P_4$ to a cell 475-2 of the grid 470 would result in an acceptable level of collision risk for the aerial vehicle 410, as determined based on average or minimum distances between segments leading from the points $P_3$, $P_5$ and into and out of points within the cell 475-2, the point $P_4$ may be relocated to a point within the cell 475-2.

Figure 4G:
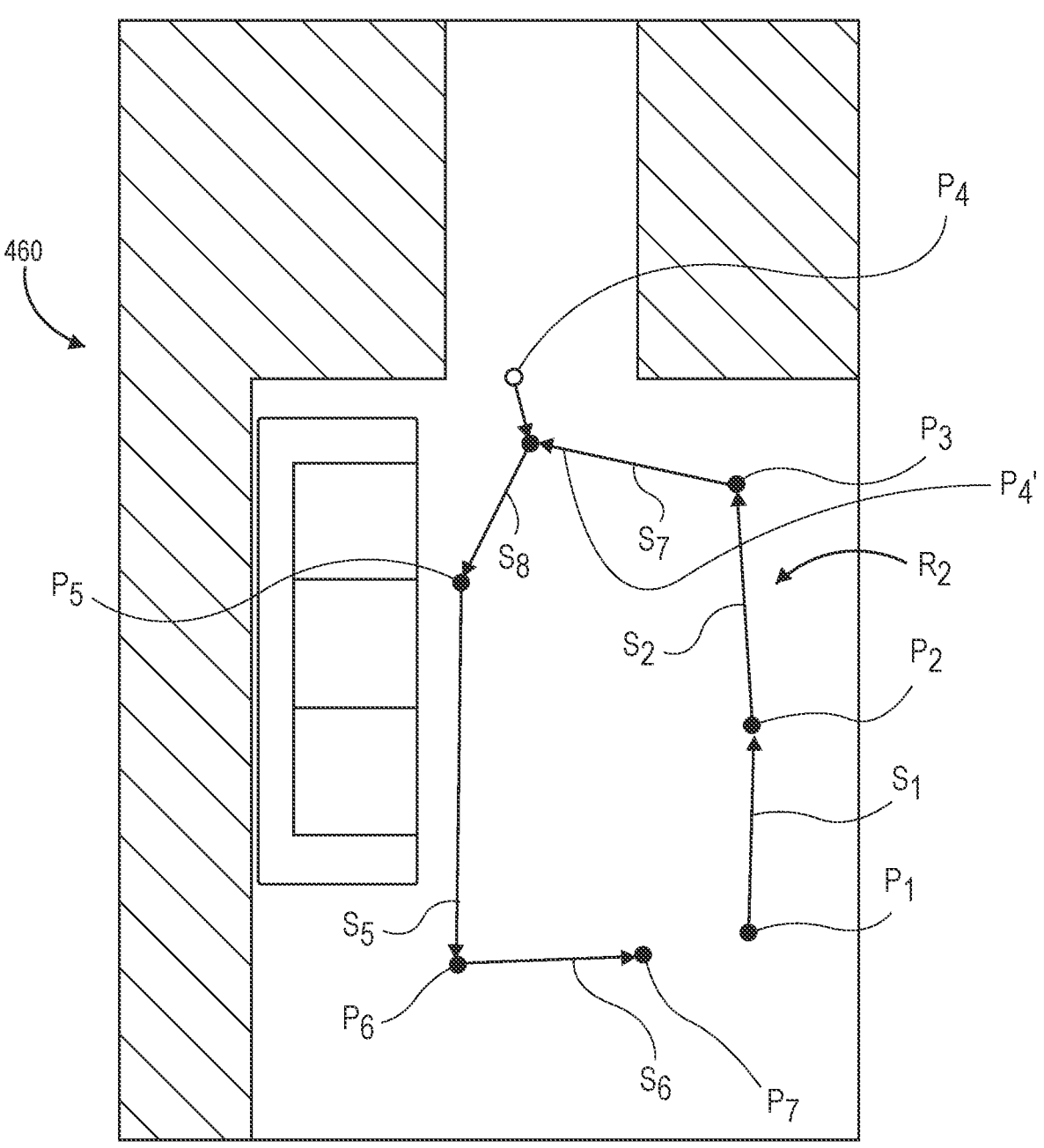

As is shown in FIG. 4G, an updated simplified route $R_2$ is determined after relocating the point $P_4$ from the cell 475-1 to a point $P_4{}'$ within the cell 475-2, as shown in FIG. 4F. The updated simplified route $R_2$ includes the points $P_1$, $P_2$, $P_3$, $P_5$, $P_6$, $P_7$ and the segments $S_1$, $S_2$, $S_5$, $S_6$ of the simplified route $R_1$, as well as a segment $S_7$ from the point $P_3$ to the relocated point $P_4{}'$, and a segment $S_8$ from the relocated point $P_4{}'$ to the point $P_5$. Once the updated simplified route $R_2$ has been determined, the aerial vehicle 410 may be programmed to travel along the updated simplified route $R_2$ while performing any number of tasks or missions within the indoor space 460.

Processes for identifying and relocating a point having a greatest level of collision risk, such as is shown in FIGS. 4A through 4G, may be repeated for any number of points having levels of collision risk above an acceptable threshold or limit. For example, after relocating the point $P_4$ from the cell 475-1 to the point $P_4{}'$ within the cell 475-2, as shown in FIG. 4F, and generating the updated simplified route $R_2$, as shown in FIG. 4G, levels of collision risk may be determined for each of the points of the updated simplified route $R_2$, based on average or minimum distances between the segments $S_1$, $S_2$, $S_7$, $S_8$, $S_5$, $S_6$ and any obstacles or other objects within the indoor space 460, as determined from the Euclidean Distance Transform map 435 or otherwise. Any of such points may be further relocated, as necessary, in order to ensure that the levels of collision risk for each of the points of a route are below the acceptable threshold or limit.

Figure 5A:
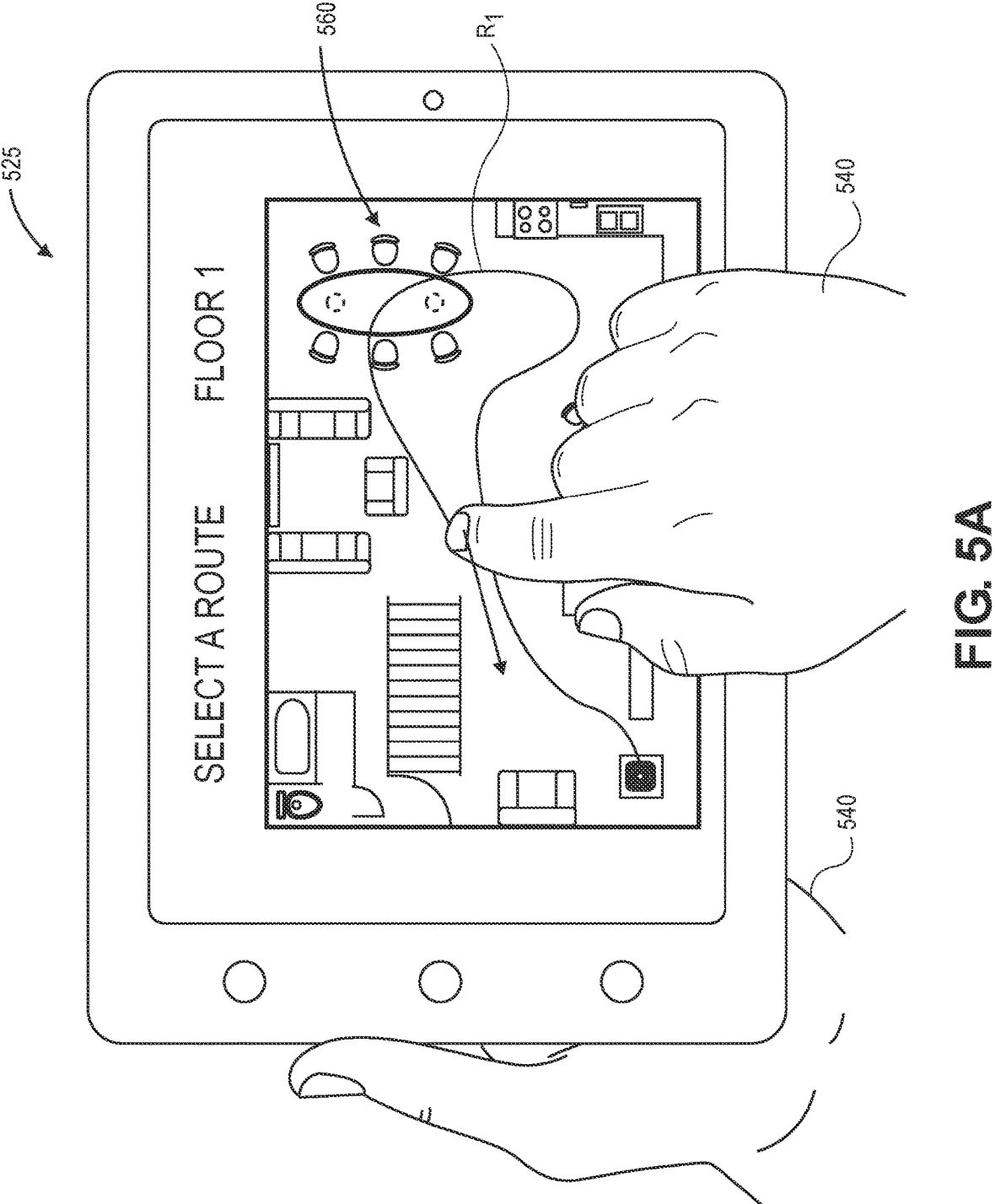
FIGS. 5A and 5B are views of aspects of one system for route planning in accordance with embodiments of the present disclosure.
Figure 5B:
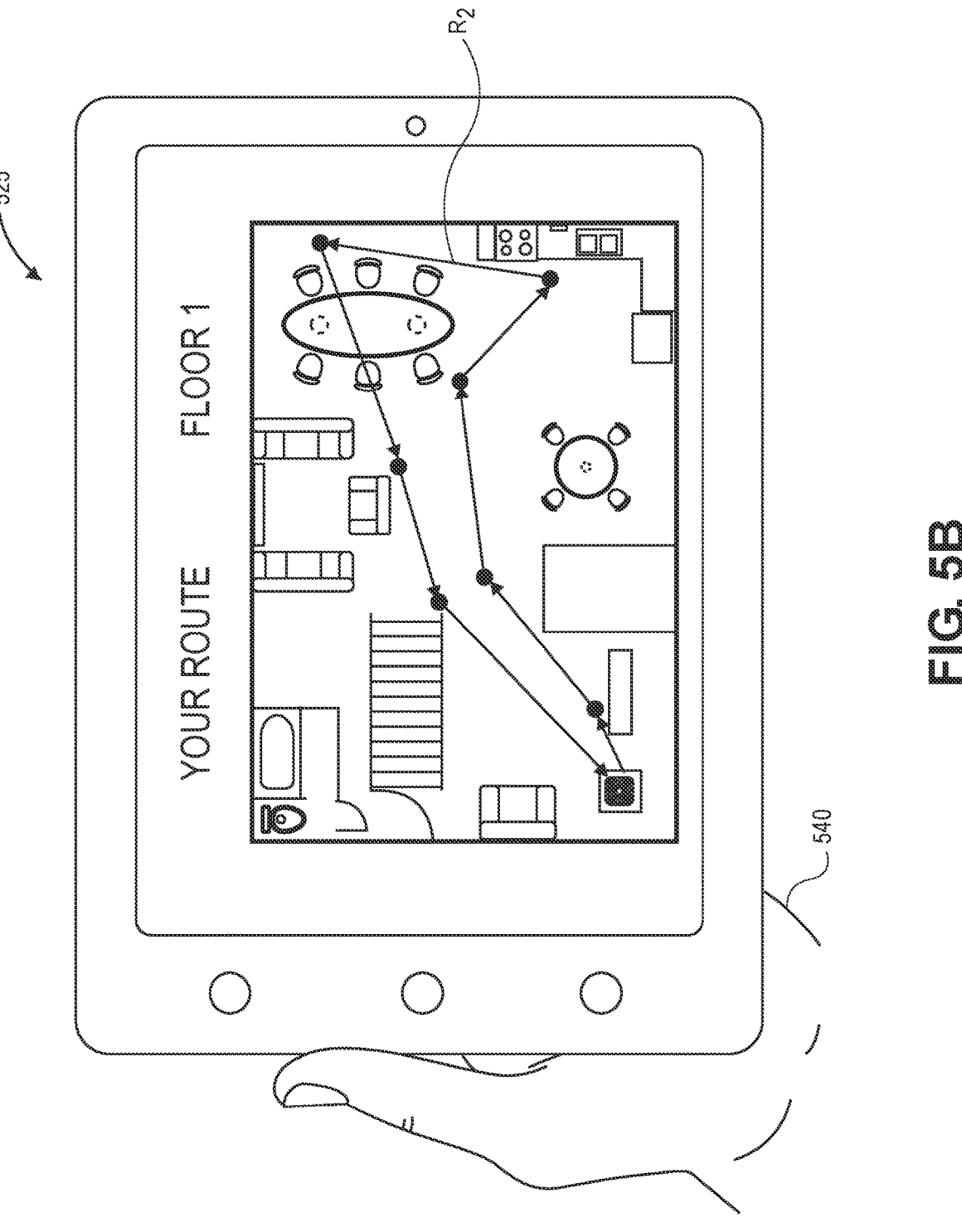

Raw data from which a route may be initially determined may be received from any source, and need not be obtained by hand-carrying an aerial vehicle throughout a space, such as is shown in FIGS. 1B through 1D and 4A. Referring to FIGS. 5A and 5B, views of aspects of one system for route planning in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4G, by the number "2" shown in FIG. 2 or by the number "1" shown in FIGS. 1A through 1L.

As is shown in FIG. 5A, a user 540 (e.g., a human operator) executes a number of gestures or other interactions with an interactive touchscreen display of a mobile device 525 (e.g., a smartphone or tablet computer) having a two-dimensional representation of an indoor space 560 rendered thereon. The user 540 drags a tip of one or more fingers (or, alternatively, a stylus or another input/output device) along the interactive touchscreen display of the mobile device 525. Raw data representing positions within the indoor space 560 is determined based on portions of the interactive touchscreen display contacted by the user 540, and a route $R_1$ may be determined for an aerial vehicle based on the raw data.

As is shown in FIG. 5B, a simplified route $R_2$ may be determined based on the route $R_1$ or the raw data received from or selected by the user 540, such as by reducing a number of points of the route $R_1$ according to an iterative fit algorithm, such as the Douglas-Peucker Algorithm (or the Ramer-Douglas-Peucker Algorithm), and updating the simplified route $R_2$ to account for positions of obstacles or other objects, as necessary, based on an environment map or an Euclidean Distance Transform map, or in any other manner.

Figure 6A:
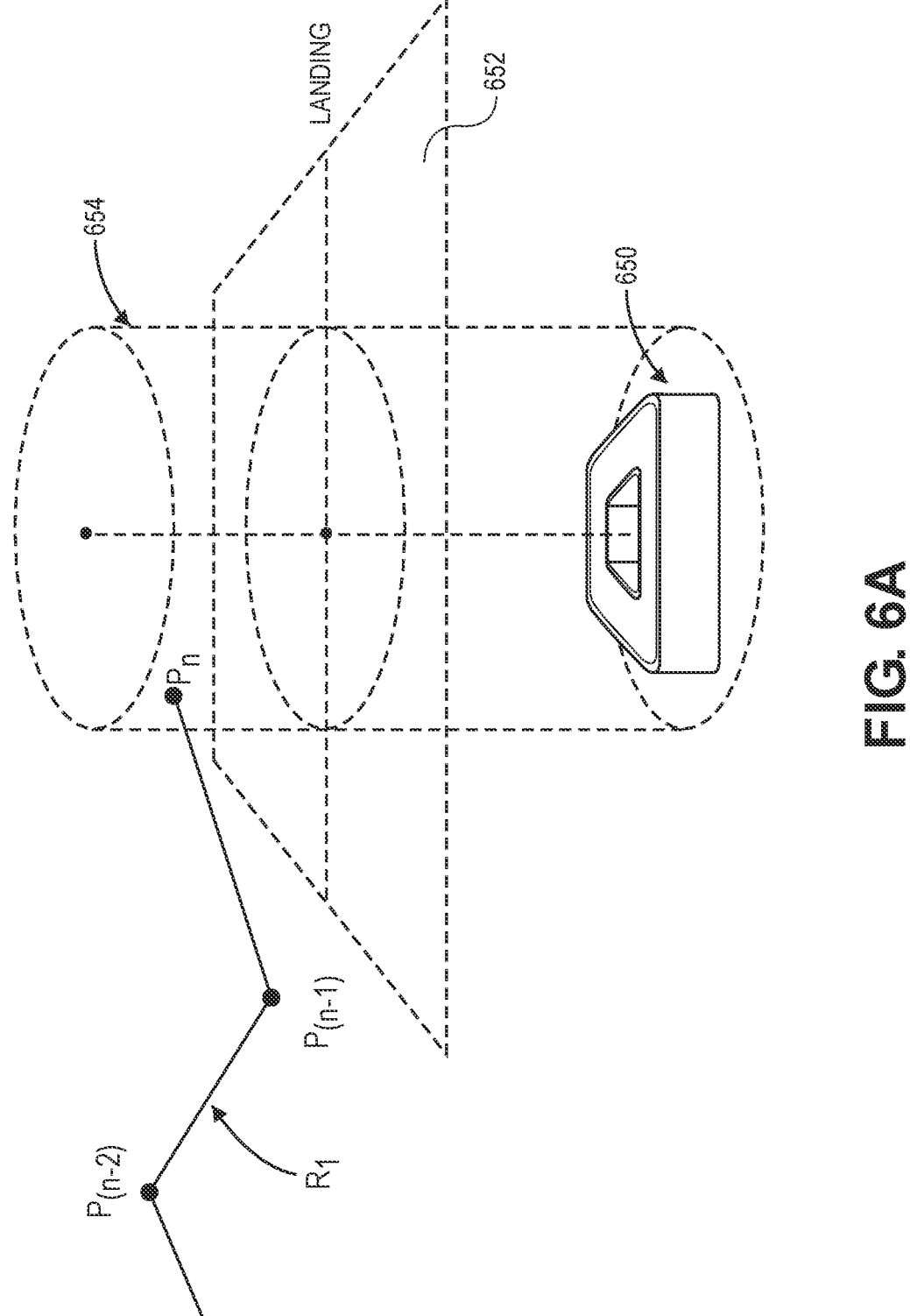
FIGS. 6A and 6B are views of aspects of one system for route planning in accordance with embodiments of the present disclosure.
Figure 6B:
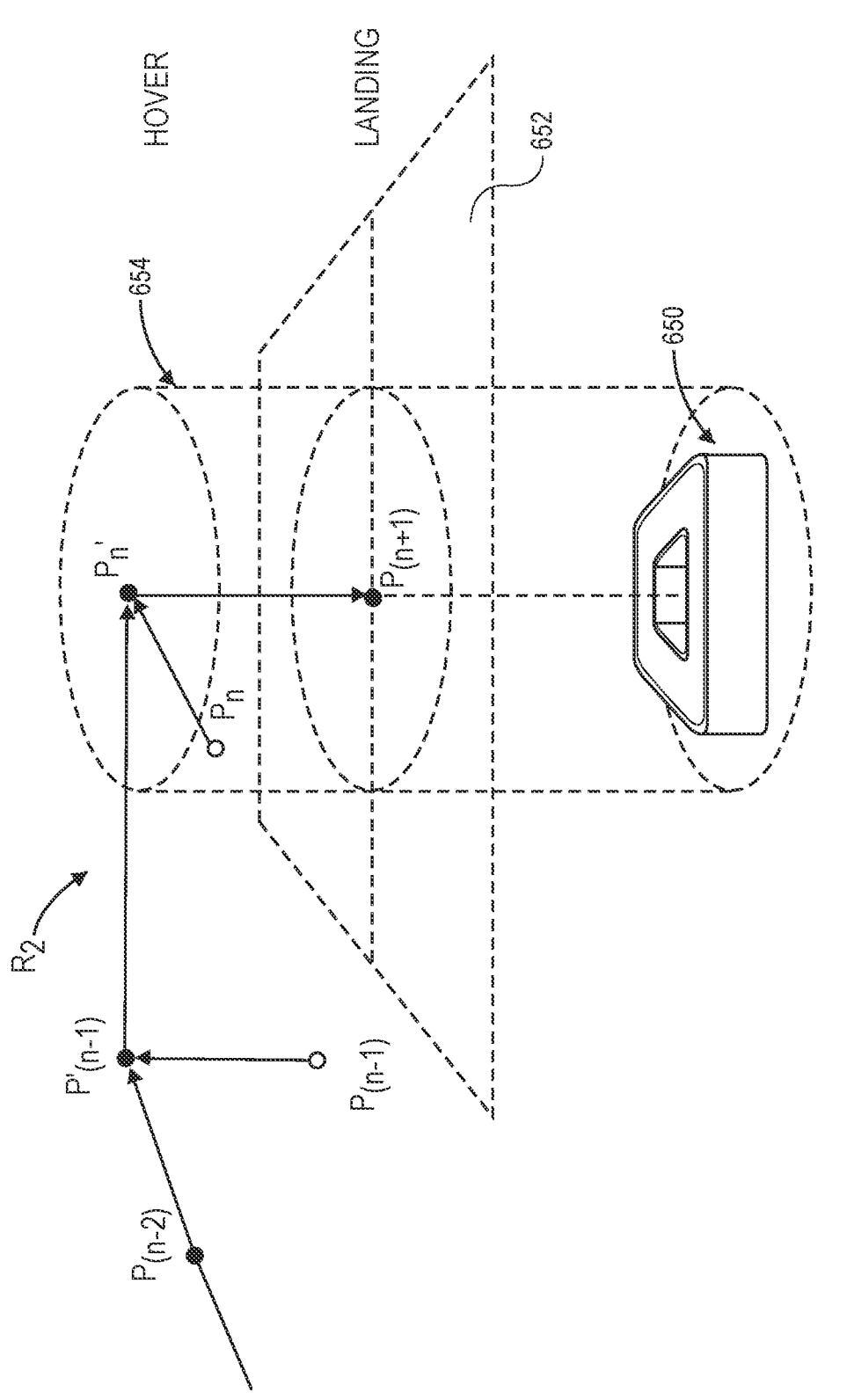

A route for an aerial vehicle generated from raw data, or a simplified or updated route generated based on the route, may be further modified, e.g., by post-processing, to ensure that the route includes takeoff or hovering and landing points in appropriate positions, and to enable an aerial vehicle to safely take off from or land at a dock or another station. Referring to FIGS. 6A and 6B, views of aspects of one system for route planning in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "4" shown in FIGS. 4A through 4G, by the number "2" shown in FIG. 2 or by the number "1" shown in FIGS. 1A through 1L.

As is shown in FIG. 6A, a portion of a route $R_1$ including a plurality of points $P_{(n-2)}$, $P_{(n-1)}$, $P_n$ is within a vicinity of a dock 650 for an aerial vehicle (not shown). The route $R_1$ may have been generated in any manner, and based on raw data obtained from any source, such as positions and/or orientations of an aerial vehicle carried by a user within an indoor space, or from one or more gestures or other interactions with a computer system. Alternatively, or additionally, the route $R_1$ may have been generated by simplifying such raw data, or an initial route generated therefrom, e.g., by removing one or more points therefrom, or relocating one or more points to account for the presence of obstacles or other objects within a vicinity of one or more segments, or to otherwise reduce a level of collision risk associated with one or more of the points.

Once a route, such as the route $R_1$ of FIG. 6A, has been generated from raw data, the points of the route may be filtered to include only airborne points, and to remove any other points that are misaligned with respect to a dock or another station, or are too close to the dock or station. For example, points of a route may be filtered to remove points that are below a minimum takeoff or landing point, e.g., below a virtual boundary such as a plane at a constant altitude above a dock or station to enable an aerial vehicle to execute necessary maneuvers or operations for safely taking off from or landing on the dock or station. Points of a route may also be filtered to remove points that are within a predetermined radius of a dock or station, e.g., within a virtual boundary such as a sphere defined by the radius from a point associated with the dock or station. Points of a route may be further filtered to remove points that are within a predetermined radius of a centerline or a normal axis of a dock or station, e.g., within a virtual boundary such as a cylinder defined by the radius from the centerline or normal axis above the dock or station.

As is shown in FIG. 6A, where a point of the route $R_1$, such as the point $P_n$, is within one or more virtual boundaries, e.g., a cylinder defined by a centerline or normal axis above the dock 650 and a radius from the centerline, the point may be relocated or removed, as necessary, to ensure that an aerial vehicle may travel along a suitable route for a takeoff evolution or a landing evolution, as necessary.

For example, as is shown in FIG. 6B, a route $R_2$ for enabling an aerial vehicle to land on the dock 650 may be defined by moving the point $P_n$ of the route $R_1$ to a position directly above the dock 650, e.g., aligned along the centerline a normal axis at a predetermined altitude above the dock 650. The point $P_n$ may represent a position to which an aerial vehicle must travel in order to prepare to land, e.g., a hovering point, directly above the dock 650. Moreover, in some implementations, a previous point $P_{(n-1)}$ in the route may also be elevated to a common height or elevation with the point $P_n$, to ensure that travel from the point $P_{(n-1)}$ to the point $P_n$ is in or near a common plane, and at a common elevation above the dock 650.

Additionally, as is further shown in FIG. 6B, the route $R_2$ may further include an additional point, viz., a point $P_{(n+1)}$, not included in the route $R_1$. The point $P_{(n+1)}$ may represent a final endpoint of the route $R_1$, e.g., a position at which an aerial vehicle would commence a landing evolution into the dock 650.

The processes discussed above with regard to FIGS. 6A and 6B and relating to modifying a route based on positions of a dock or another station may be similarly applied to create a takeoff point for the aerial vehicle, e.g., an initial endpoint of the route $R_1$, e.g., a position to which an aerial vehicle would travel during a takeoff evolution from the dock 650. For example, points of a route may be filtered to include only airborne points, and to remove any other points that are misaligned with respect to a dock or another station, or are too close to the dock or station, e.g., below a virtual boundary such as a plane at a constant altitude above a dock or station, within a virtual boundary such as a sphere having a predetermined radius from a dock or station, or within a virtual boundary such as a cylinder having a predetermined radius from a centerline or a normal axis of a dock or station.

The contents of U.S. patent application Ser. Nos. 16/584, 721 and 17/029,688, and International Patent Application No. PCT/US2020/052268, are incorporated by reference herein in their entireties.

Although some embodiments of the present disclosure show the use of unmanned aerial vehicles in support of one or more applications or functions at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function. Moreover, none of the embodiments or implementations described herein is limited to use only by aerial vehicles having structures, geometries or configurations shown in the drawings or described herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount. Moreover, where one or more comparisons or determinations of "greater than" or "less than" are described herein, such comparisons or determinations may also refer to "greater than or equal to" or "less than or equal to," respectively.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:

receiving first data representing a first route for a first aerial vehicle within an indoor space, wherein the first data indicates a first plurality of points in three-dimensional space, and wherein the first route begins at a first point of the first plurality of points and ends at a second point of the first plurality of points;

determining a second route for the first aerial vehicle based on the first data and a first threshold distance, wherein the second route comprises a first subset of the first plurality of points defining a first plurality of segments, and wherein each point of the first plurality of points is within the first threshold distance of at least one of the first plurality of segments;

receiving second data indicating positions of a plurality of objects within the indoor space, wherein the second data was captured by at least one sensor provided aboard one of the first aerial vehicle or a second aerial vehicle;

calculating a risk of collision for each one of the first subset of the first plurality of points, wherein the risk of collision calculated for each one of the first subset of the first plurality of points is calculated based at least in part on a minimum distance between each one of the first plurality of segments into or out of the one of the first subset of the first plurality of points and a nearest one of the plurality of objects;

determining that a risk of collision calculated for a third point of the first plurality of points exceeds a predetermined threshold, wherein a first segment of the first plurality of segments extends between the third point and a fourth point of the first plurality of points, and wherein a second segment of the first plurality of segments extends between the third point and a fifth point of the first plurality of points; and in response to determining that the risk of collision calculated for the third point of the first plurality of points exceeds the predetermined threshold, selecting a sixth point in three-dimensional space, wherein the sixth point is proximate the third point;

determining that a third segment defined between the sixth point and the fourth point is not within a second threshold distance from the nearest one of the plurality of objects;

determining that a fourth segment defined between the sixth point and the fifth point is not within the second threshold distance from the nearest one of the plurality of objects;

determining a third route for the first aerial vehicle, wherein the third route comprises a second plurality of points in three-dimensional space defining a second plurality of segments, wherein the second plurality of points comprises the first point, the fourth point, the fifth point, and the sixth point, wherein the second plurality of points does not comprise the third point, and wherein the second plurality of segments comprises the third segment and the fourth segment; and programming the first aerial vehicle to travel along the third route.

2. The method of claim 1, wherein calculating the risk of collision for each one of the first subset of the first plurality of points comprises:

applying a grid comprising a plurality of cells to a two-dimensional representation of the indoor space, wherein each of the cells has a common size, and wherein the third point corresponds to a first cell of the plurality of cells;

calculating risks of collision for each of a subset of the plurality of cells; and determining that a risk of collision associated with a second cell of the subset of the plurality of cells is below the predetermined threshold, wherein the sixth point corresponds to the second cell of the plurality of cells, and wherein the sixth point is selected in response to determining that the risk of collision associated with the second cell of the subset of the plurality of cells is below the predetermined threshold.

3. The method of claim 2, wherein each of the subset of the plurality of cells surrounds the first cell in the grid.

4. The method of claim 1, further comprising:

determining that each one of the second plurality of points is within the first threshold distance of at least one of the second plurality of segments.

5. The method of claim 1, wherein the second route is generated according to a Douglas-Peucker algorithm.

6. The method of claim 1, wherein the second data represents an environment map derived based at least in part on a point cloud comprising a second plurality of points in three-dimensional space representing a plurality of surfaces within the indoor space, and wherein at least a portion of the second data was captured by the at least one sensor provided aboard the one of the first aerial vehicle or the second aerial vehicle.

7. The method of claim 1, further comprising:

generating a distance map corresponding to a two-dimensional representation of the indoor space, wherein the distance map comprises a plurality of cells, wherein each one of the plurality of cells corresponds to one portion of the indoor space, wherein each one of the plurality of cells has a value corresponding to a distance between the one portion of the indoor space and a nearest object, and wherein that the third segment is not within the second threshold distance from the nearest one of the plurality of objects is determined based at least in part on the distance map.

8. The method of claim 1, wherein the first data is captured by the at least one sensor provided aboard the one of the first aerial vehicle or the second aerial vehicle as the one of the first aerial vehicle or the second aerial vehicle travels substantially along the first route while being carried by a human.

9. The method of claim 1, wherein receiving the first data comprises:

receiving at least a portion of the first data from a mobile device, wherein the mobile device comprises an interactive touch-screen display, and wherein the first data was captured by the mobile device based on input received via the interactive touchscreen display.

10. The method of claim 1, further comprising causing the first aerial vehicle to travel along the third route.

11. The method of claim 1, wherein the first aerial vehicle comprises a frame defined by a pair of covers and a plurality of sides, wherein each of the plurality of sides has a common first height, wherein the frame has a substantially square cross-section, and wherein a plurality of propulsion motors is provided within the frame.

12. The method of claim 1, further comprising:

determining a position of a dock for the first aerial vehicle; and relocating the second point to a position at a predetermined altitude above the position of the dock.

13. An aerial vehicle comprising:

a plurality of propulsion motors;

at least one sensor, wherein the at least one sensor comprises an inertial sensor, a position sensor, or an imaging device;

a control system in communication with each of the plurality of propulsion motors and the at least one sensor, wherein the control system comprises one or more computer processors and one or more memory components, and wherein the one or more memory components are programmed with one or more sets of instructions that, when executed by the one or more computer processors, cause the aerial vehicle to at least:

receive first data representing a first route within an indoor space, wherein the first data indicates a first plurality of points in three-dimensional space, and wherein the first route begins at a first point of the first plurality of points and ends at a second point of the first plurality of points;

determine a second route based on the first data and a first threshold distance, wherein the second route comprises a first subset of the first plurality of points defining a first plurality of segments, and wherein each point of the first plurality of points is within the first threshold distance of at least one of the first plurality of segments;

receive second data indicating positions of a plurality of objects within the indoor space, wherein the second data was captured by the at least one sensor;

calculate a risk of collision for each one of the first subset of the first plurality of points, wherein the risk of collision calculated for each one of the first subset of the first plurality of points is calculated based at least in part on a minimum distance between each one of the first plurality of segments into or out of the one of the first subset of the first plurality of points and a nearest one of the plurality of objects;

determine that a risk of collision calculated for a third point of the first plurality of points exceeds a predetermined threshold, wherein a first segment of the first plurality of segments extends between the third point and a fourth point of the first plurality of points, and wherein a second segment of the first plurality of segments extends between the third point and a fifth point of the first plurality of points; and in response to determining that the risk of collision calculated for the third point of the first plurality of points exceeds the predetermined threshold, select a sixth point in three-dimensional space, wherein the sixth point is proximate the third point;

determine that a third segment defined between the sixth point and the fourth point is not within a second threshold distance from the nearest one of the plurality of objects;

determine that a fourth segment defined between the sixth point and the fifth point is not within the second threshold distance from the nearest one of the plurality of objects;

determine a third route for the aerial vehicle, wherein the third route comprises a second plurality of points in three-dimensional space defining a second plurality of segments, wherein the second plurality of points comprises the first point, the fourth point, the fifth point, and the sixth point, wherein the second plurality of points does not comprise the third point, and wherein the second plurality of segments comprises the third segment and the fourth segment; and program the aerial vehicle to travel along the third route.

14. The aerial vehicle of claim 13, wherein the one or more sets of instructions, when executed by the one or more computer processors, further cause the aerial vehicle to at least:

apply a grid comprising a plurality of cells to a two-dimensional representation of the indoor space, wherein each of the cells has a common size, and wherein the third point corresponds to a first cell of the plurality of cells;

calculate risks of collision for each of a subset of the plurality of cells; and determine that a risk of collision associated with a second cell of the subset of the plurality of cells is below the predetermined threshold, wherein the sixth point corresponds to the second cell of the plurality of cells, and wherein the sixth point is selected in response to determining that the risk of collision associated with the second cell of the subset of the plurality of cells is below the predetermined threshold.

15. The aerial vehicle of claim 13, wherein the one or more sets of instructions, when executed by the one or more computer processors, further cause the aerial vehicle to at least:

operate one or more of the plurality of propulsion motors to cause the aerial vehicle to travel along the third route.

16. The aerial vehicle of claim 13, wherein the one or more sets of instructions, when executed by the one or more computer processors, further cause the aerial vehicle to at least:

determine a position of a dock; and relocate the second point to a position at a predetermined altitude above the position of the dock.

17. A computer system comprising:

a plurality of computer processors;

at least one data store; and at least one transceiver, wherein the at least one data store is programmed with one or more sets of instructions that, when executed by the computer system, cause the computer system to at least:

receive first data representing a first route for a first aerial vehicle within an indoor space, wherein the first data indicates a first plurality of points in three-dimensional space, and wherein the first route begins at a first point of the first plurality of points and ends at a second point of the first plurality of points;

determine a second route for the first aerial vehicle based on the first data and a first threshold distance, wherein the second route comprises a first subset of the first plurality of points defining a first plurality of segments, and wherein each point of the first plurality of points is within the first threshold distance of at least one of the first plurality of segments;

receive second data indicating positions of a plurality of objects within the indoor space, wherein the second data was captured by at least one sensor provided aboard one of the first aerial vehicle or a second aerial vehicle;

calculate a risk of collision for each one of the first subset of the first plurality of points, wherein the risk of collision calculated for each one of the first subset of the first plurality of points is calculated based at least in part on a minimum distance between each one of the first plurality of segments into or out of the one of the first subset of the first plurality of points and a nearest one of the plurality of objects;

determine that a risk of collision calculated for a third point of the first plurality of points exceeds a predetermined threshold, wherein a first segment of the first plurality of segments extends between the third point and a fourth point of the first plurality of points, and wherein a second segment of the first plurality of segments extends between the third point and a fifth point of the first plurality of points; and in response to determining that the risk of collision calculated for the third point of the first plurality of points exceeds the predetermined threshold, select a sixth point in three-dimensional space, wherein the sixth point is proximate the third point;

determine that a third segment defined between the sixth point and the fourth point is not within a second threshold distance from the nearest one of the plurality of objects;

determine that a fourth segment defined between the sixth point and the fifth point is not within the second threshold distance from the nearest one of the plurality of objects;

determine a third route for the first aerial vehicle, wherein the third route comprises a second plurality of points in three-dimensional space defining a second plurality of segments, wherein the second plurality of points comprises the first point, the fourth point, the fifth point, and the sixth point, wherein the second plurality of points does not comprise the third point, and wherein the second plurality of segments comprises the third segment and the fourth segment; and program the first aerial vehicle to travel along the third route.

18. The computer system of claim 17, wherein the second data represents an environment map derived based at least in part on a point cloud comprising a plurality of points in three-dimensional space representing a plurality of surfaces within the indoor space, and wherein at least a portion of the second data was captured by the at least one sensor provided aboard the one of the first aerial vehicle or the second aerial vehicle.

19. The computer system of claim 17, wherein the one or more sets of instructions, when executed by the computer system, further cause the computer system to at least:

receive at least a portion of the first data from a mobile device, wherein the mobile device comprises an interactive touchscreen display, and wherein the first data was captured by the mobile device based on input received via the interactive touchscreen display.

20. The computer system of claim 17, wherein the one or more sets of instructions, when executed by the computer system, further cause the computer system to at least:

determine a position of a dock for the first aerial vehicle; and relocate the second point to a position at a predetermined altitude above the position of the dock.

\* \* \* \* \*